United States Patent
Alashkar et al.

(10) Patent No.: US 11,861,771 B2
(45) Date of Patent: Jan. 2, 2024

(54) VIRTUAL HAIR EXTENSION SYSTEM

(71) Applicant: AlgoFace, Inc., Carefree, AZ (US)

(72) Inventors: Taleb Alashkar, Royal Oak, MI (US); Amjad Hussain, Bloomfield Hills, MI (US); Ivan Livinsky, Kyiv (UA)

(73) Assignee: AlgoFace, Inc., Carefree, AZ (US)

( * ) Notice: Subject to any disclaimer, the term of this patent is extended or adjusted under 35 U.S.C. 154(b) by 51 days.

(21) Appl. No.: 17/665,214

(22) Filed: Feb. 4, 2022

(65) Prior Publication Data
US 2022/0254080 A1    Aug. 11, 2022

Related U.S. Application Data

(60) Provisional application No. 63/146,010, filed on Feb. 5, 2021.

(51) Int. Cl.
| | |
|---|---|
| *G06T 11/60* | (2006.01) |
| *G06T 7/11* | (2017.01) |
| *G06T 7/60* | (2017.01) |
| *G06T 3/40* | (2006.01) |
| *G06T 11/00* | (2006.01) |

(Continued)

(52) U.S. Cl.
CPC ............ *G06T 11/60* (2013.01); *G06T 3/40* (2013.01); *G06T 7/11* (2017.01); *G06T 7/60* (2013.01); *G06T 7/90* (2017.01); *G06T 11/001* (2013.01); *G06F 3/0482* (2013.01); *G06T 2200/24* (2013.01); *G06T 2207/10024* (2013.01); *G06T 2207/20081* (2013.01); *G06T 2207/20084* (2013.01); *G06T 2207/30201* (2013.01)

(58) Field of Classification Search
CPC ......... G06F 3/0482; G06T 2207/20084; G06T 7/11; G06T 7/90; G06T 3/40; G06T 11/60; G06T 7/60; G06T 11/001; G06T 2207/10024; G06T 2200/24; G06T 2207/20081; G06T 2207/30201; G06T 11/00
See application file for complete search history.

(56) References Cited

U.S. PATENT DOCUMENTS

| | | | |
|---|---|---|---|
| 2013/0064465 A1* | 3/2013 | Tin ........................... | G06T 7/11 382/248 |
| 2015/0052008 A1* | 2/2015 | Campbell .............. | G06Q 50/01 705/26.8 |
| 2018/0068344 A1* | 3/2018 | Sultzaberger ...... | G06Q 30/0256 |

(Continued)

*Primary Examiner* — Phi Hoang
(74) *Attorney, Agent, or Firm* — Buckert Patent & Trademark Law Firm PC; John F. Buckert

(57) ABSTRACT

A virtual hair extension system is provided. The system includes a memory device having a user image of a user having hair, a display device, and a computer that is operably coupled to the memory device and the display device. The computer has a hair segmentation module and a hair extension blending module. The hair segmentation module generates a binary hair mask based on the user image. The hair extension blending module generates a final modified user image having the hair of the user with a selected hair extension thereon utilizing the user image, the binary hair mask, and a reference image of the selected hair extension. The computer displays the final modified user image having the hair of the user with the selected hair extension thereon on the display device.

19 Claims, 28 Drawing Sheets
(7 of 28 Drawing Sheet(s) Filed in Color)

(51) Int. Cl.
*G06T 7/90* (2017.01)
*G06F 3/0482* (2013.01)

(56) References Cited

U.S. PATENT DOCUMENTS

2019/0035163 A1* 1/2019 Skwarek .............. G06V 40/165
2020/0294243 A1* 9/2020 Li ............................ G06T 7/11
2021/0264300 A1* 8/2021 Staudinger ........... G06V 10/762

* cited by examiner

| Sub-Group of Colors | Color Shades |
|---|---|
| Black | Off-black, Jet-black |
| Brown | Mocha Brown, Dark Brown, Ash Brown |
| Blonde | Ash Blonde, Dirty Blonde, Sandy Blonde |
| | |
FIG. 13
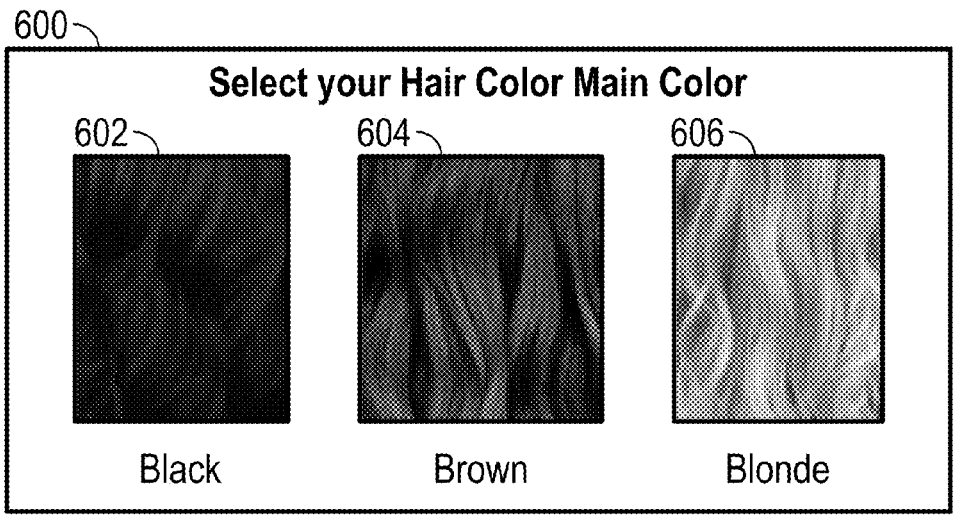
FIG. 14
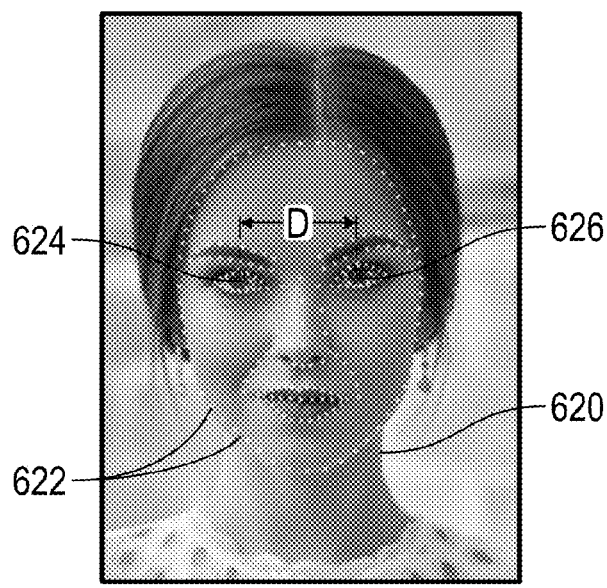
Frontal Image
FIG. 15

Rear Image

SKUs Dashboard

≡ Custom date selection — 1412

Export File — 1500

| SKU Name | Add to Cart Clicks | Tryouts | Conversion Rate |
|---|---|---|---|
| SKU Name | # of clicks | # of Tryouts | % Conversion |
| SKU Name | # of clicks | # of Tryouts | % Conversion |
| SKU Name | # of clicks | # of Tryouts | % Conversion |
| SKU Name | # of clicks | # of Tryouts | % Conversion |
| SKU Name | # of clicks | # of Tryouts | % Conversion |
| SKU Name | # of clicks | # of Tryout | |

1420, 1422, 1424, 1426, 1428, 1430

1410

All columns are able to filter te list SKU Name- alphabetically

All others - high to low or low to high

FIG. 27

VIRTUAL HAIR EXTENSION SYSTEM

CROSS-REFERENCE TO RELATED APPLICATIONS

This application claims priority to U.S. Provisional Patent Application No. 63/146,010 filed on Feb. 5, 2021, the entire contents of which are hereby incorporated by reference herein.

BACKGROUND

Customers that are shopping online for hair extension products have a difficult time finding a desired hair extension. In particular, hair extensions often come in numerous hair colors and shades which often confuse the customer. Further, customers often order the wrong hair extension product which results in the customer returning the product to the online retail company. As a result of these incorrect orders, customers have to undesirably wait for additional shipments of the hair extensions. Further, the incorrect orders result in additional shipping costs and additional customer support time.

The inventors herein have recognized that it would be advantageous to provide a virtual hair extension system that analyzes a user image of the customer to determine a hair color of the customer, and then to display hair extensions based on the hair color of the customer, and then to display a modified user image of the customer wearing a selected hair extension.

SUMMARY

A virtual hair extension system in accordance with an exemplary embodiment is provided. The virtual hair extension system includes a memory device having a user image of a user having hair. The virtual hair extension system further includes a display device. The virtual hair extension system further includes a computer that is operably coupled to the memory device and the display device. The computer has a hair segmentation module, and a hair extension blending module. The hair segmentation module generates a binary hair mask based on the user image. The hair extension blending module generates a final modified user image having the hair of the user with a selected hair extension thereon utilizing the user image, the binary hair mask, and a reference image having the selected hair extension therein. The computer displays the final modified user image having the hair of the user with the selected hair extension thereon on the display device.

A virtual hair extension system in accordance with another exemplary embodiment is provided. The virtual hair extension system includes a memory device having a user image of a user having hair. The virtual hair extension system includes a computer that is operably coupled to the memory device. The computer has a hair color matching module. The hair color matching module generates a segmented user hair image in a HSV color space from a segmented user hair image in an RGB color space. The hair color matching module generates a normalized histogram of hair pixels from the segmented user hair image in the HSV color space. The hair color matching module selects hair pixels in a selected set of most populated bins in the normalized histogram of hair pixels to obtain a compressed histogram of hair pixels. The hair color matching receives a user input indicating a first color sub-group. The hair color matching module selects one of a black shades classifier module, a brown shades classifier module, and a blonde shades classifier module which is a selected shades classifier module based on the selected color sub-group. The selected shades classifier module determines a plurality of confidence scores associated with a plurality of color shades. Each confidence score indicates a probability that a color of hair in the segmented user hair image in the HSV color space matches a color shade associated with the selected shades classifier module and further associated with a plurality of hair extensions. The hair color matching module sorts a list of the plurality of color shades based on the plurality of confidence scores from a respective color shade thereof having a highest confidence score to a respective color shade thereof having a lowest confidence score. The computer stores the list of the plurality of color shades and the associated plurality of confidence scores in the memory device such that each color shade thereof has a respective confidence score thereof.

A virtual hair extension system in accordance with another exemplary embodiment is provided. The virtual hair extension system includes a memory device having a user image of a user having hair. The virtual hair extension system further includes a computer that is operably coupled to the memory device. The computer has a hair color matching module. The hair color matching module generates a segmented user hair image in an HSV color space from a segmented user hair image in an RGB color space. The hair color matching module generates a normalized histogram of hair pixels from the segmented user hair image in the HSV color space. The hair color matching module selects hair pixels in a selected set of most populated bins in the normalized histogram of hair pixels to obtain a compressed histogram of hair pixels. The hair color matching module selects a comprehensive shades classifier module for all specified color shades of all specified color sub-groups. The comprehensive shades classifier module determines a plurality of confidence scores associated with a plurality of color shades. Each confidence score indicates a probability that a color of hair in the segmented user hair image in the HSV color space matches a color shade associated with the comprehensive shades classifier module and further associated with a plurality of hair extensions. The hair color matching module sorts a list of the plurality of color shades based on the plurality of confidence scores from a respective color shade thereof having a highest confidence score to a respective color shade thereof having a lowest confidence score. The computer stores the list of the plurality of color shades and the associated plurality of confidence scores in the memory device such that each color shade thereof has a respective confidence score thereof.

A virtual hair extension system in accordance with another exemplary embodiment is provided. The virtual hair extension system includes a memory device having a reference image of a selected hair extension, and a user image of a user having hair. The virtual hair extension system further includes a computer that is operably coupled to the memory device. The computer has a hair extension blending module. The hair extension blending module generates a hair orientation mask utilizing a binary hair mask, the user image, and a plurality of Gabor filters. The hair orientation mask indicates an orientation of the hair in the user image. The hair extension blending module determines an estimated hair length of the hair of the user utilizing the user image and the binary hair mask. The hair extension blending module generates a resized binary hair mask utilizing the binary hair mask, the estimated hair length, and a desired length and a desired volume of hair associated with a SKU of the selected hair extension. The resized binary hair mask has the desired length and the desired volume. The hair extension blending module generates a resized hair orientation mask utilizing the hair orientation mask, the estimated hair length, and the desired length and the desired volume of hair associated with the SKU of the selected hair extension. The resized hair orientation mask has the desired length and the desired volume. The hair extension blending module has a generative adversarial neural network module that generates a first modified user image and a second modified user image based on the user image, the reference image, the resized binary hair mask, and the resized hair orientation mask. The first modified user image has hair with a color corresponding to a color of the hair in the user image and having the desired length and the desired volume. The second modified user image has hair with a color corresponding to a color of the hair in the reference image and having the desired length and the desired volume. The color of the hair in the reference image is identical to the color of hair associated with the SKU of the selected hair extension. The hair extension blending module generates a blending mask by multiplying each pixel of the resized binary hair mask by a corresponding pixel of the resized hair orientation mask. The hair extension blending module has an Alpha blending module that blends the first modified user image, the second modified user image, and the blending mask to obtain a final modified user image having the hair of the user with the selected hair extension thereon.

A virtual hair extension system in accordance with another exemplary embodiment is provided. The virtual hair extension system includes a memory device and a cloud-based computer that is operably coupled to the memory device. The cloud-based computer has a hair segmentation module, and a hair extension blending module. The cloud-based computer receives a user image from a user computer. The hair segmentation module generates a binary hair mask based on the user image. The hair extension blending module generates a final modified user image having the hair of the user with a selected hair extension thereon utilizing the user image, the binary hair mask, and a reference image having the selected hair extension therein. The cloud-based computer stores the final modified user image having the hair of the user with the selected hair extension thereon in the memory device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13 is a table of sub-groups of colors, and shades associated with the sub-groups of colors utilized by the hair color matching module;

FIG. 14 is a schematic of a graphical user interface (GUI) indicating color sub-groups that can be selected by a user to indicate the color of the users hair;

FIG. 15 is schematic of a user image having a front view of a head of a user with a plurality of 2D landmarks on the face thereof that are utilized by the hair extension blending module;

FIG. 19 is a schematic of a GUI indicating hair extensions that can be selected by a user for a virtual try on;

FIG. 27 is a schematic of an SKUs dashboard that is generated by the data analytics dashboard module;

DETAILED DESCRIPTION

Figure 1:
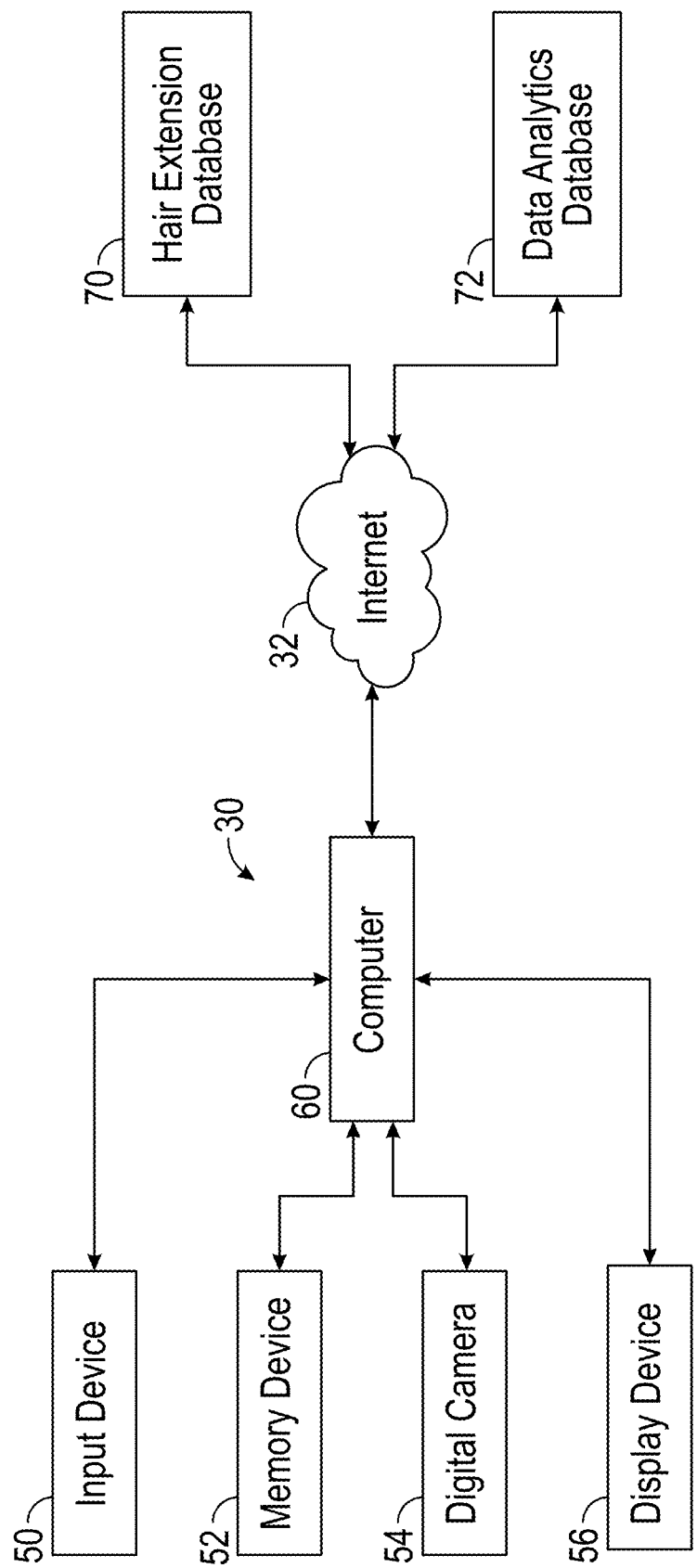
FIG. 1 is a block diagram of a virtual hair extension system in accordance with an exemplary embodiment.
Figure 2:
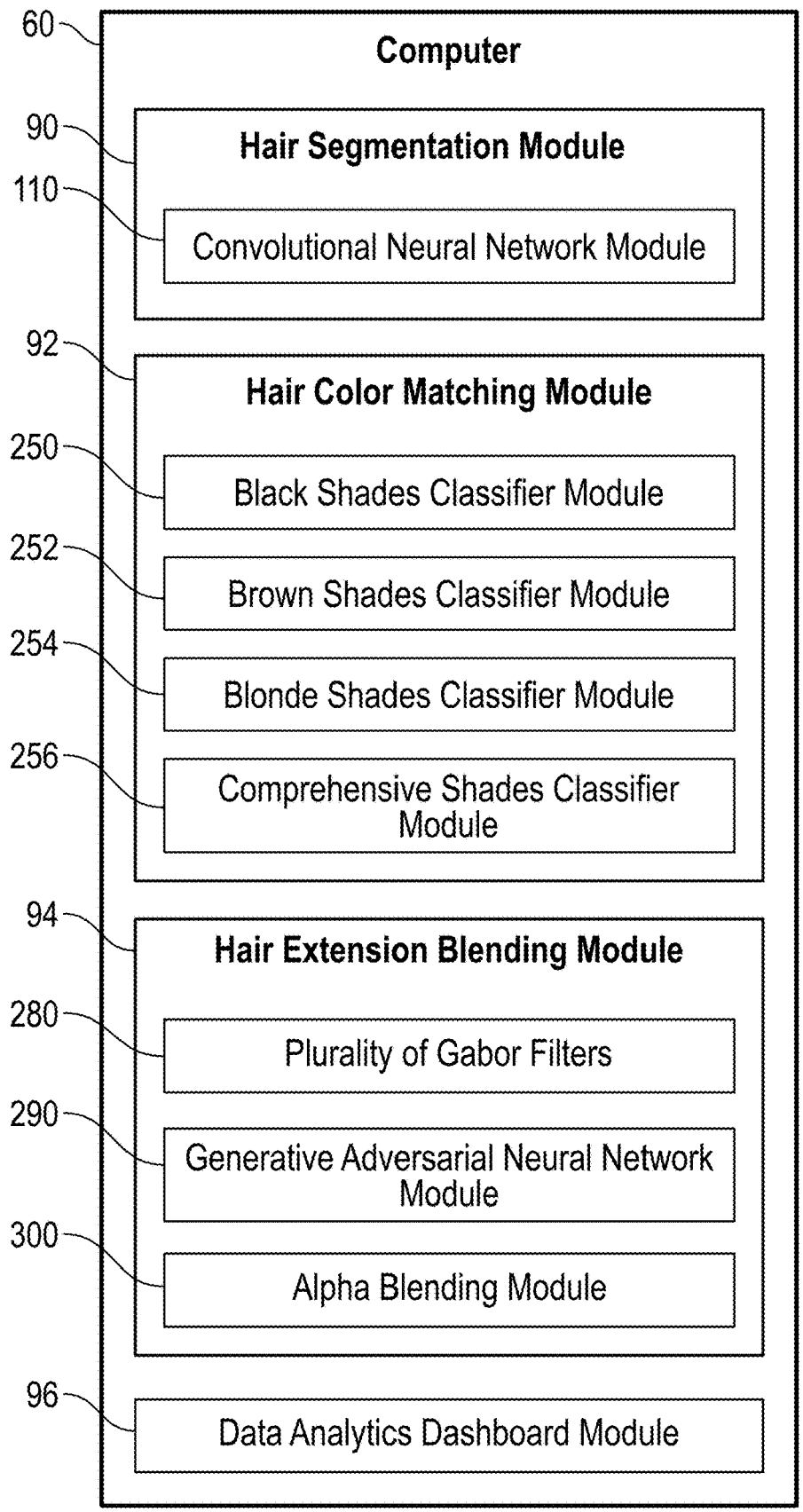
FIG. 2 is a block diagram of a computer utilized by the virtual hair extension system of FIG. 1 having a hair segmentation module, a hair color matching module, a hair extension blending module, and a data analytics dashboard module.
Figure 3:
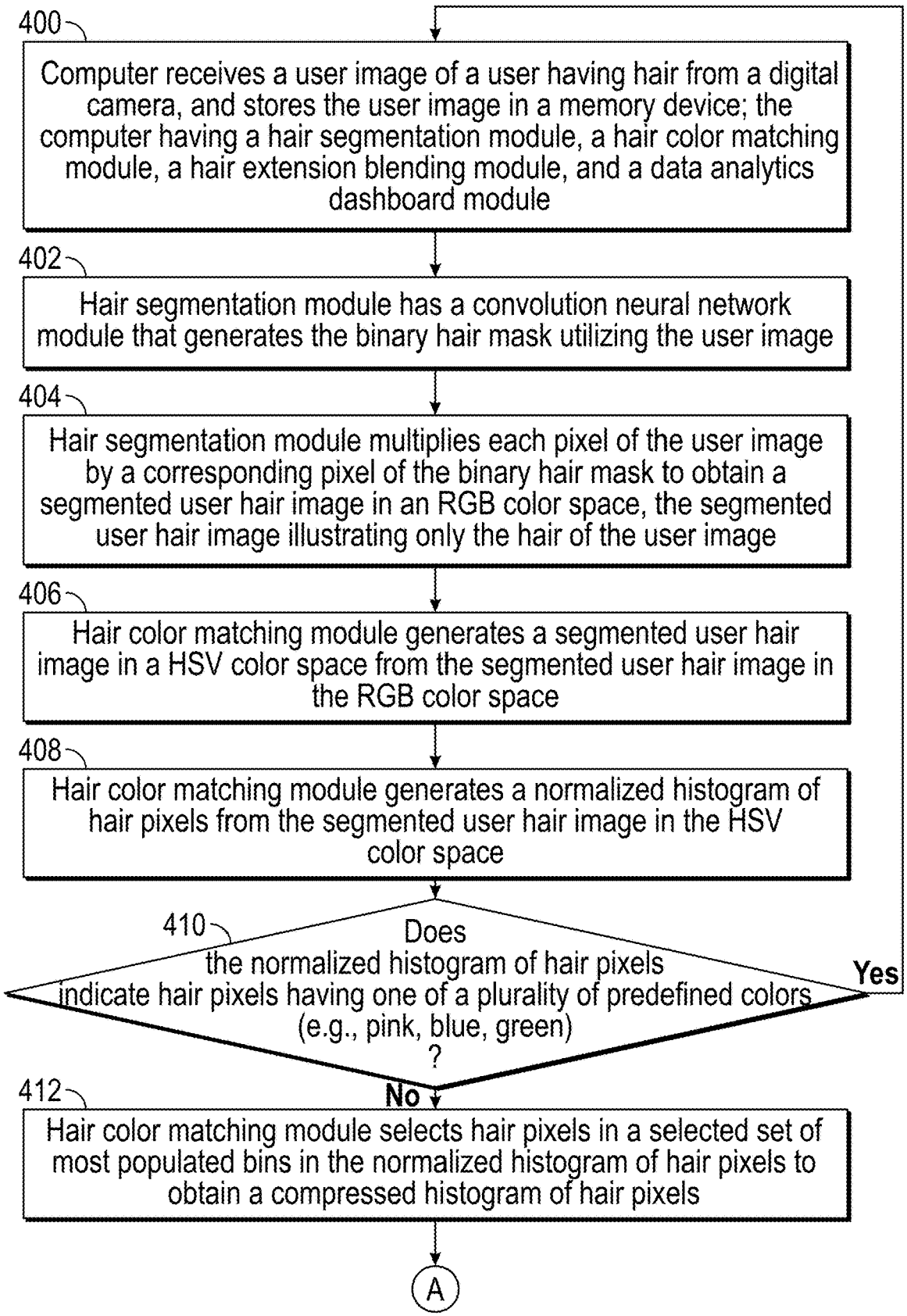
FIGS. 3-9 are a flowchart of a method for generating a final modified user image having the hair of the user with a selected hair extension thereon utilizing the virtual hair extension system of FIG. 1 in accordance with another exemplary embodiment.
Figure 4:
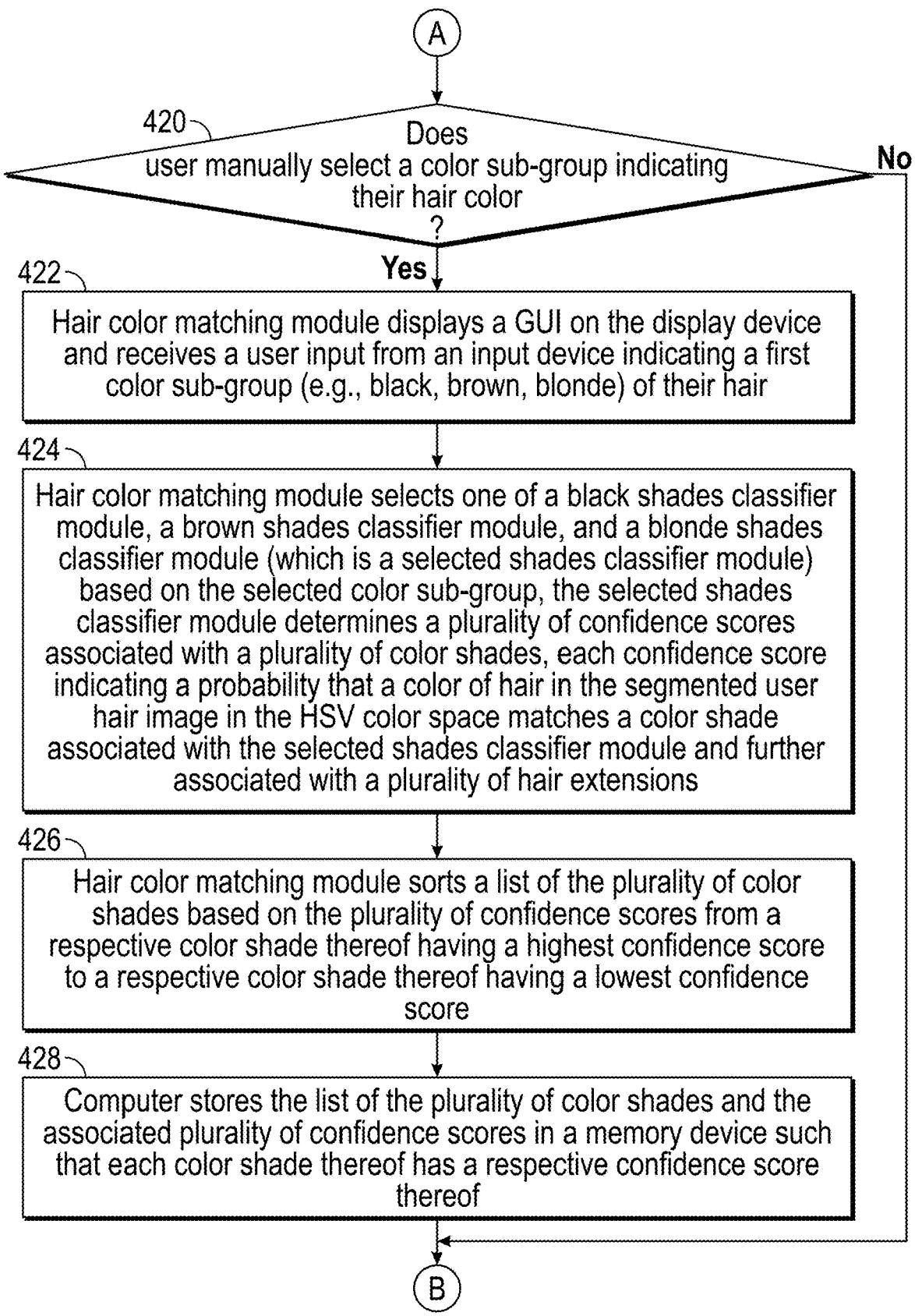
Figure 5:
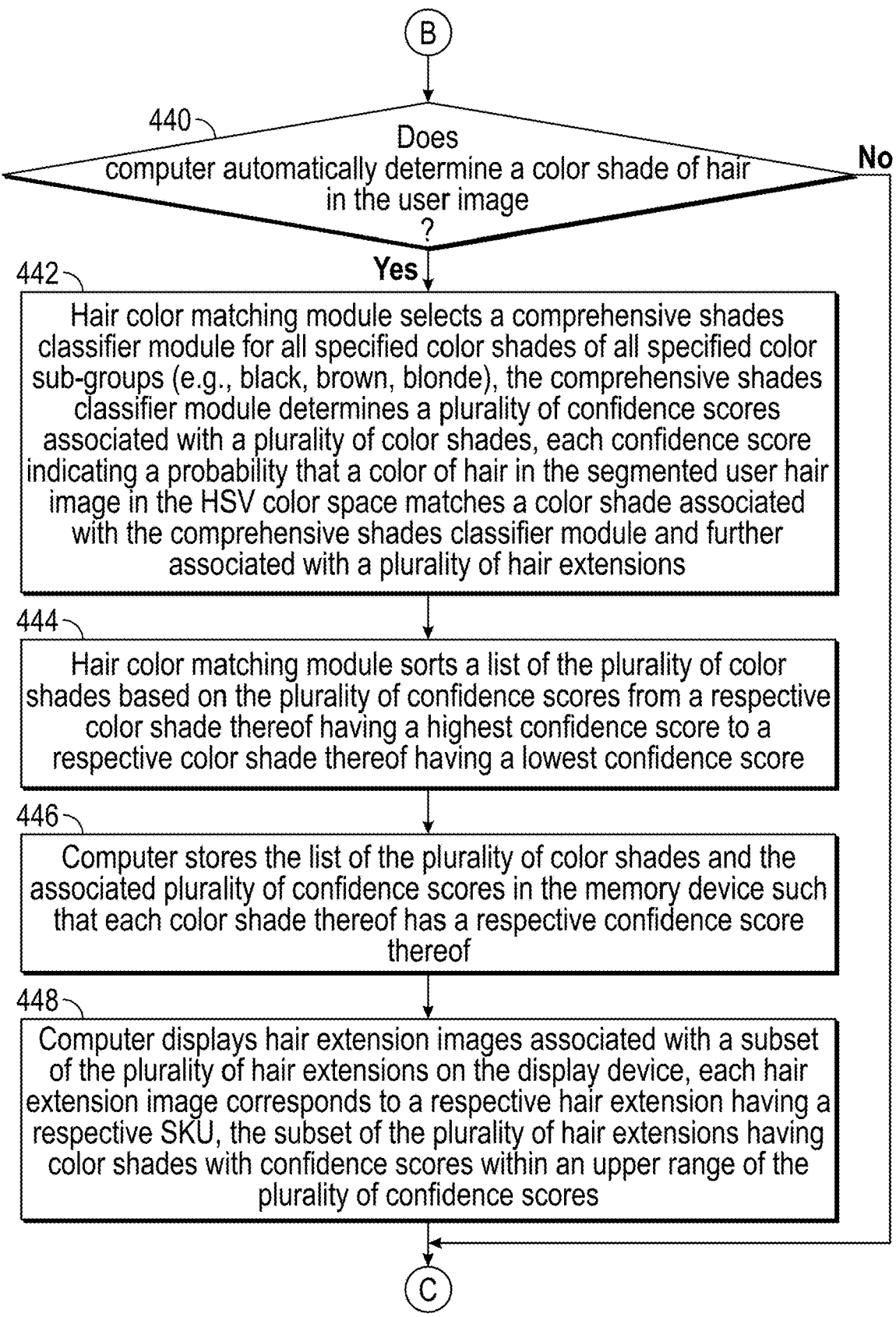
Figure 6:
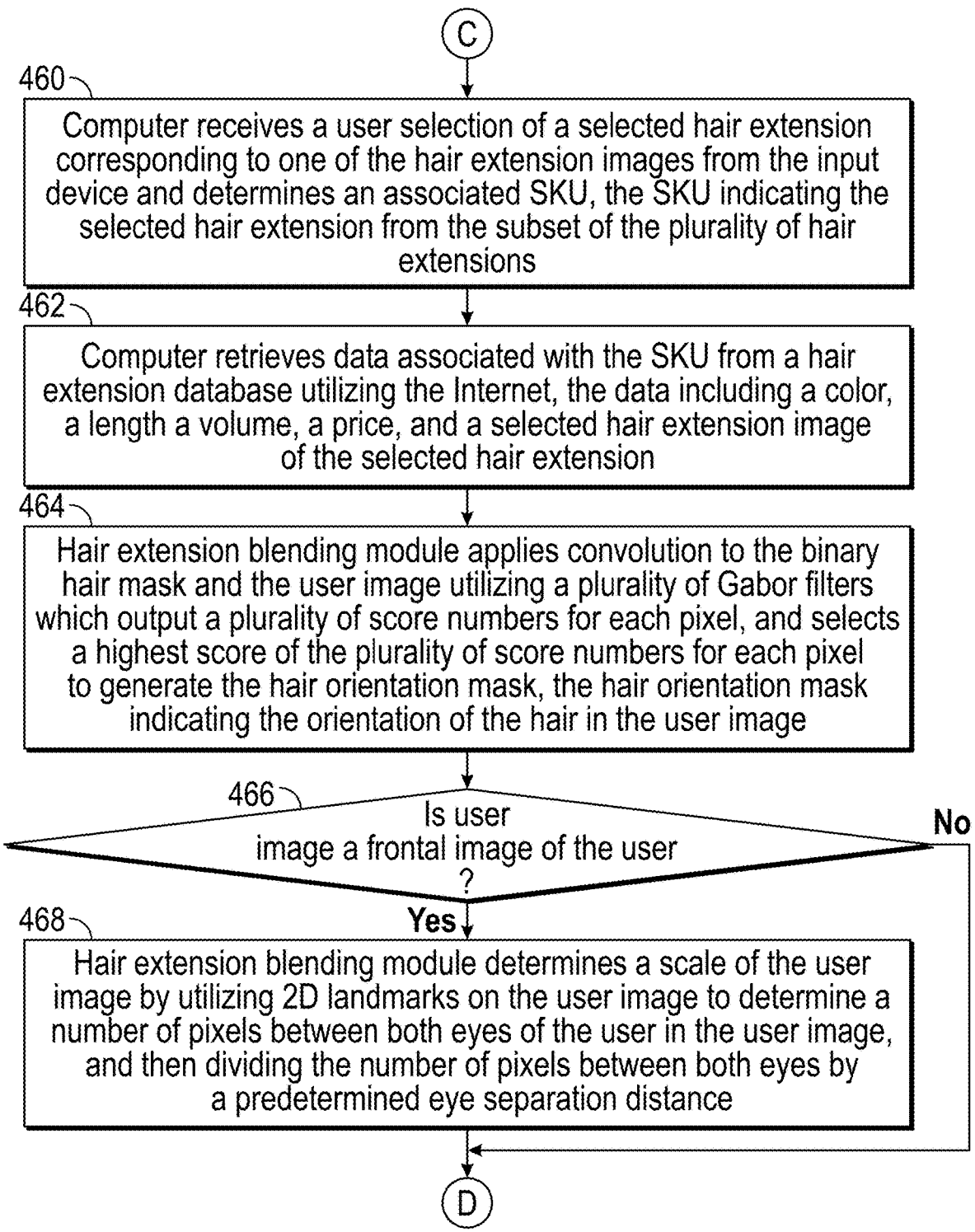
Figure 7:
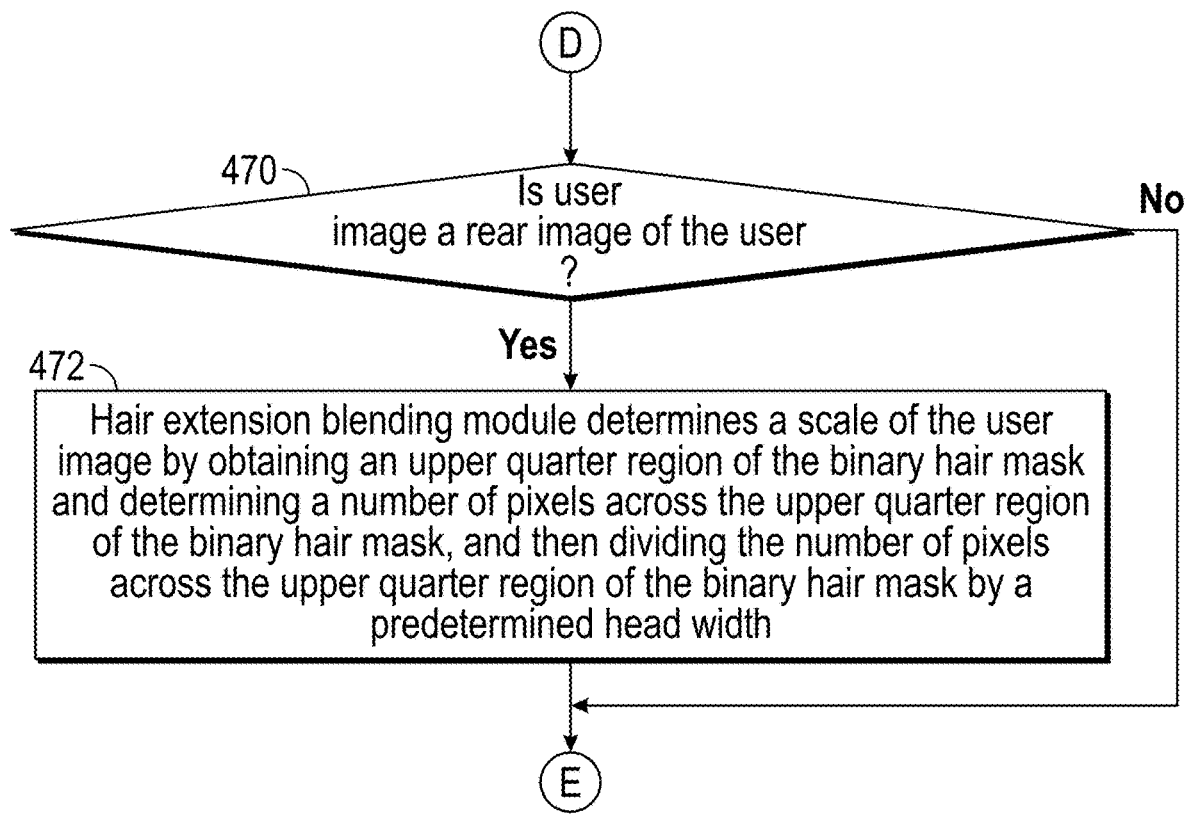
Figure 8:
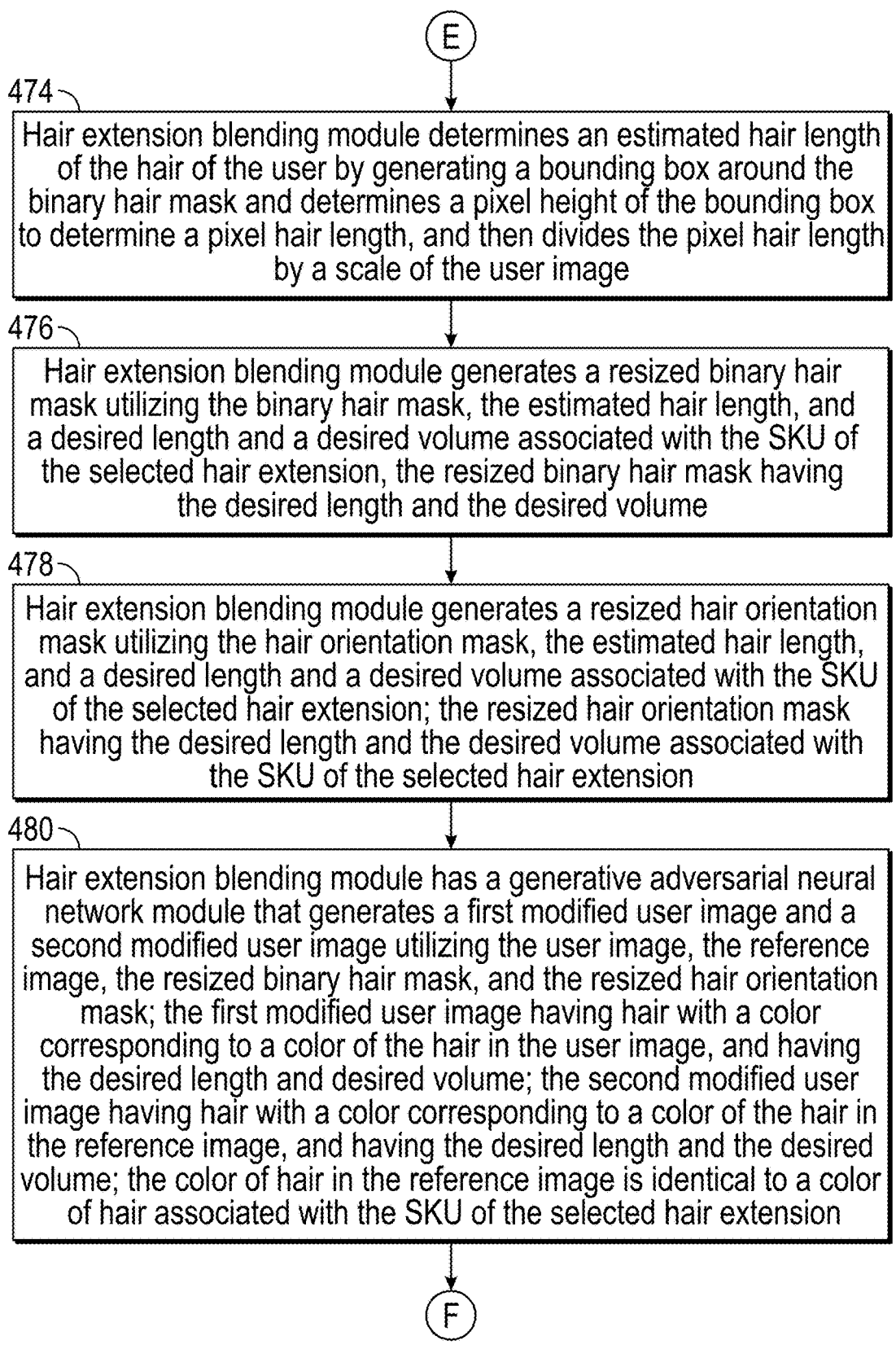
Figure 9:
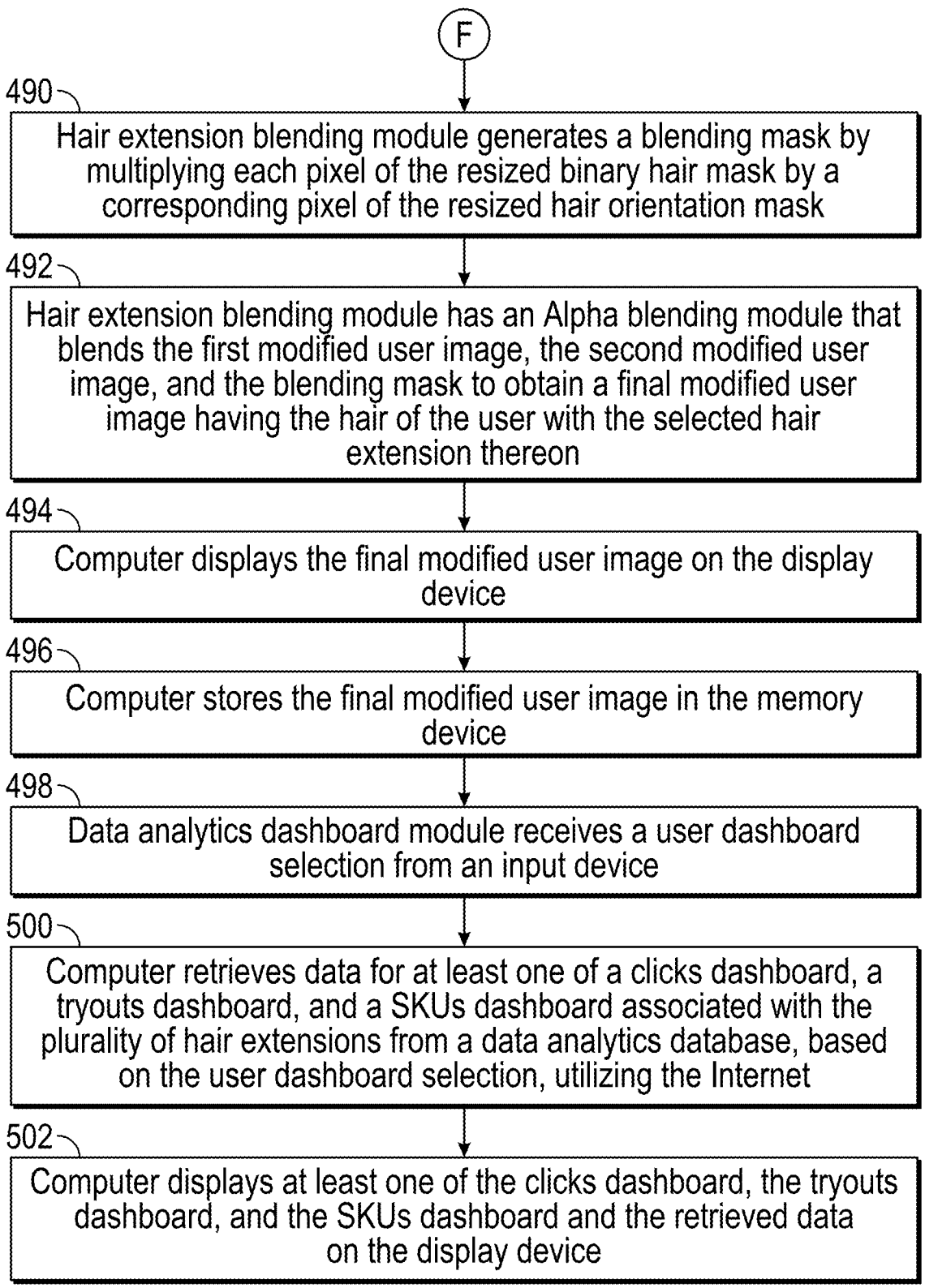

Referring to FIGS. 1 and 2, a virtual hair extension system 30 that allows a user to virtually try on a selected hair extension is illustrated. The virtual hair extension system 30 is operably coupled to the Internet 32 as shown. The virtual hair extension system 30 includes an input device 50, a memory device 52, a digital camera 54, a display device 56, a computer 60, a hair extension database 70, and a data analytics database 72.

The virtual hair extension system 30 generates a modified version of a user image (e.g., a final modified user image) that shows how the user hair will look in a realistic way when wearing a selected hair extension (identified by a specific SKU) having an associated volume, length and color. The virtual hair extension system 30 helps the user to select a desirable hair extension without the help of customer support or a hair stylist. Further, the system 10 saves the user time and money since the user does not inadvertently purchase incorrect hair extensions.

For purposes of understanding, a few terms will be defined below.

The term "module" refers to a computer application or a series of computer commands that accomplish a desired task.

The term "image" refers to a digital image.

The term "SKU" refers to a stock keeping unit and is a number (typically eight alphanumeric digits) that retailers assign to products to internally keep track of stock levels. If a product has different colors, lengths, and volumes, each product variation has a unique SKU number. As used in the flowcharts herein, the SKU refers to stock keeping unit for a specific hair extension having a specific color, length, volume, price, and hair extension image.

The term "reference image" refers to an image of a model having hair with a selected hair extension thereon having a desired color, length, and volume.

The term "RGB color space" refers to the red, green, blue color space

The term "HSV color space" refers to the hue, saturation, value color space.

The term "binary hair mask" refers to a mask image generated from a user image wherein if a pixel in the user image is classified as hair, a corresponding pixel in the binary hair mask has a value of 255 (e.g., white color), and if a pixel in the user image 540 is not classified as hair, a corresponding pixel in the binary hair mask has a value of 0 (e.g., black color).

The term "Gabor filter" refers to is a linear filter used for texture analysis, which means that it analyzes whether there is any specific frequency content in the image in specific directions in a localized region around the point or region of analysis. In the spatial domain, a 2-D Gabor filter is a Gaussian kernel function modulated by a sinusoidal plane wave.

The term "hair orientation mask" refers to an image generated by a user image and a binary hair mask that indicates the specific directions of hair.

The term "generative adversarial neural network module" also known as a generative adversarial network (GAN) is a module that utilizes two neural networks that contest with each other in a game (in the form of a zero-sum game, where one agent's gain is another agent's loss). Given a training set, this technique learns to generate new data with the same statistics as the training set. The core idea of a GAN is based on the "indirect" training through the discriminator, another neural network that is able to tell how much an input is "realistic", which itself is also being updated dynamically. This basically means that the generator is not trained to minimize the distance to a specific image, but rather to fool the discriminator. This enables the model to learn in an unsupervised manner.

The term "Alpha blending module" refers to a module that performs a process of combining multiple images with a background to create the appearance of partial or full transparency. It is often useful to render pixels in separate passes or layers and then combine the resulting images into a single, final image called a composite. In order to combine the pixels of the images correctly, it is necessary to keep an associated matte for each element in addition to its color. This matte layer contains the coverage information—the shape of the geometry being drawn—making it possible to distinguish between parts of the image where something was drawn and parts that are empty.

The terms "try on" and tryout" used herein mean a virtual try on of a selected hair extension.

Referring to FIG. 1, the virtual hair extension system 30 will now be discussed. As discussed above, the virtual hair extension system 30 generates a modified version of a user image (e.g., a final modified user image) that shows how the user hair will look in a realistic way when wearing a selected hair extension (identified by a specific SKU) having an associated volume, length and color.

The input device 50 is provided to receive user input that is utilized by the computer 60 for implementing the associated methods described herein. The input device 50 is operably coupled to the computer 60 and communicates with the computer 60.

The memory device 52 is provided to store data utilized by the computer 60 for performing the associated operations and methods described herein. The memory device 52 is operably coupled to the computer 60 and communicates with the computer 60.

The digital camera 54 is provided to generate a user image of a person having hair and to send the user image to the computer 60. The digital camera 54 is operably coupled to the computer 60 and communicates with the computer 60.

The display device 56 is provided to display graphical user interfaces and images in response to display instructions received from the computer 60. The display device 56 is operably coupled to the computer 60 and communicates with the computer 60.

Referring to FIGS. 1 and 2, the computer 60 is provided to implement the associated methods described herein. The computer 60 is operably coupled to the input device 50, the memory device 52, the digital camera 54, the display device 56, and the Internet 32. The computer 60 communicates with the hair extension database 70 and the data analytics database 72 via the Internet 32.

The computer 60 includes a hair segmentation module 90, a hair color matching module 92, a hair extension blending module 94, and a data analytics dashboard module 96.

Figure 11:
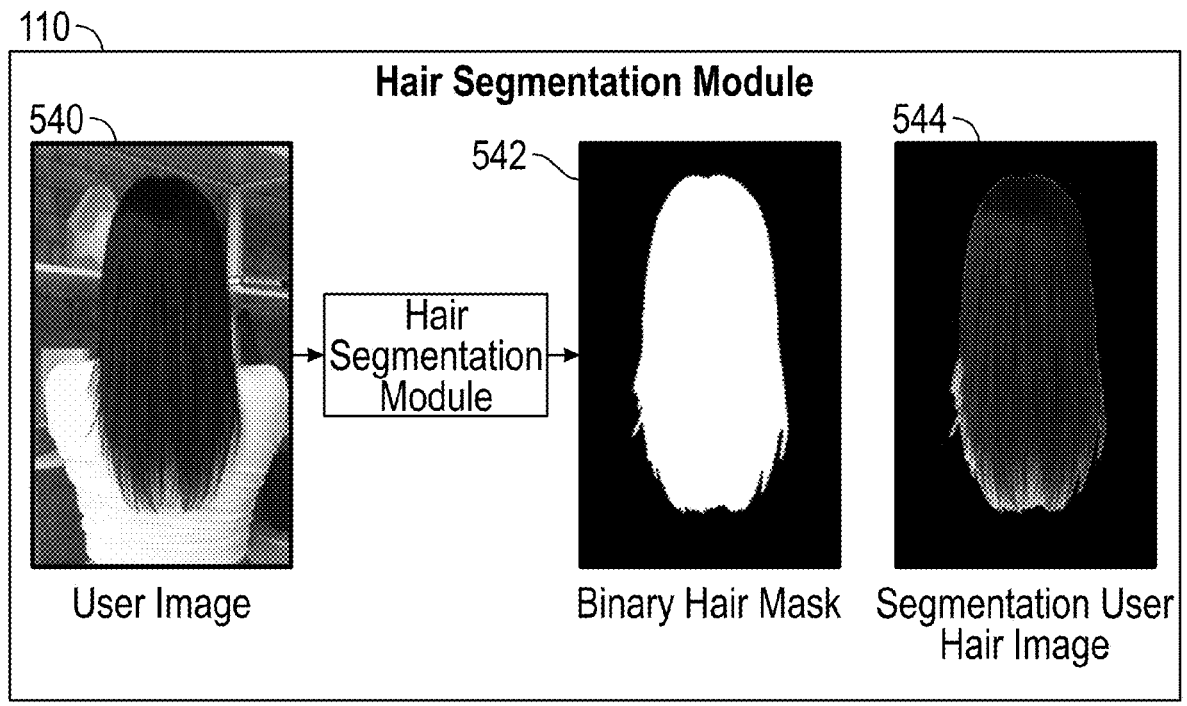
FIG. 11 is a schematic of a user image, a binary hair mask, a segmented user hair image in a RGB color space wherein the hair segmentation module utilizes the user image to generate the binary hair mask, and the hair segmentation module utilizes the user image and the binary hair mask to generate the segmented user hair image.

Referring to FIGS. 2 and 11, the hair segmentation module 90 is provided to receive a user image 540 and to generate a binary hair mask 542 utilizing the user image 540. The binary hair mask 542 has the same pixel dimensions as the user image 540. If a pixel in the user image 540 is classified as hair, a corresponding pixel in the binary hair mask has a value of 255 (e.g., white color). Otherwise, if a pixel in the user image 540 is not classified as hair, a corresponding pixel in the binary hair mask 542 has a value of 0 (e.g., black color).

Figure 10:
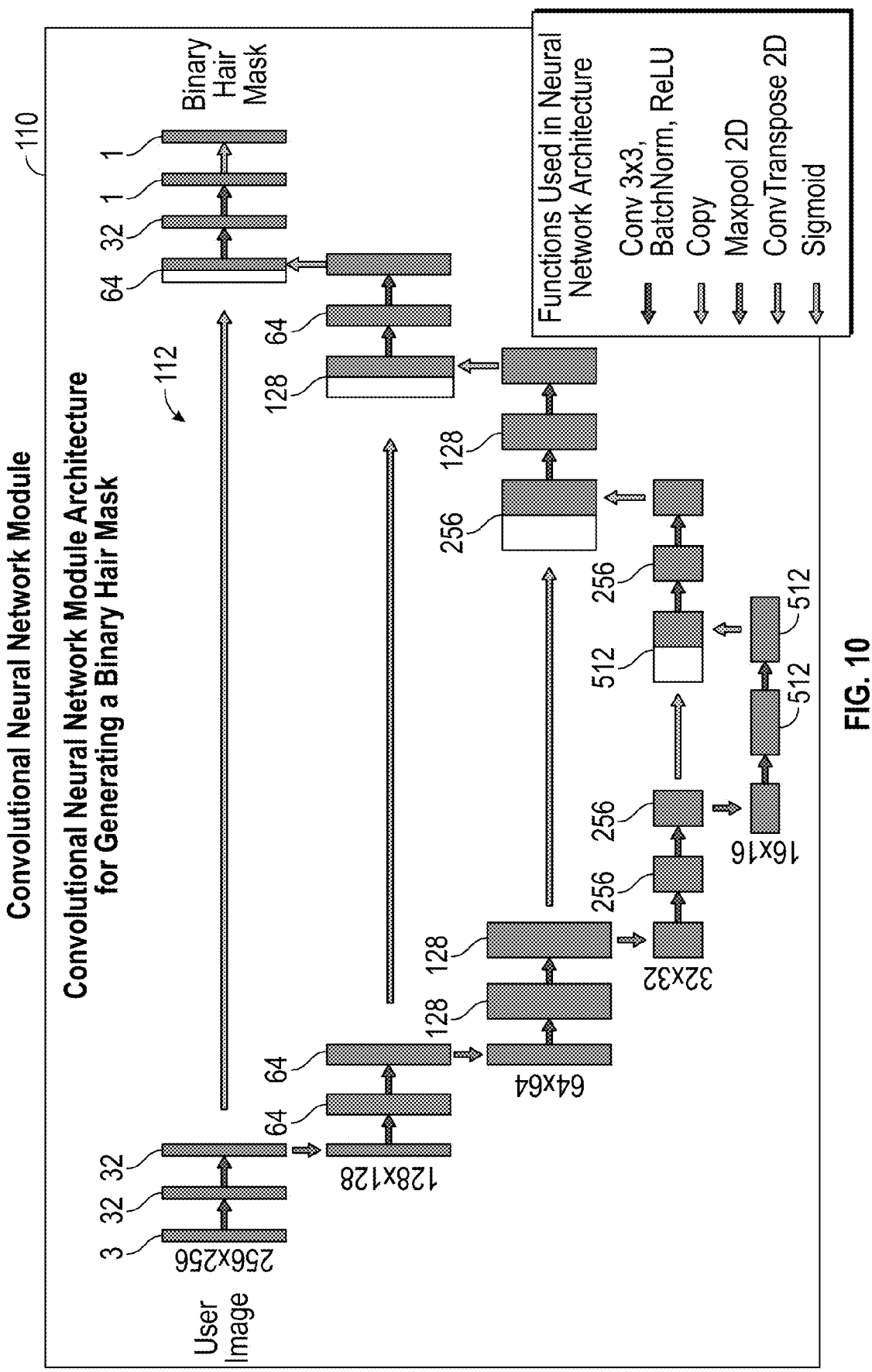
FIG. 10 is a block diagram of a convolution neural network architecture of a convolution neural network module for generating a binary hair mask that is utilized in the hair segmentation module.

Referring to FIG. 10, the hair segmentation module 90 utilizes a supervised learning approach with a convolutional neural network module 110 to generate the binary hair mask 542 based on the user image 540. The convolutional neural network module 110 is defined and can be implemented by the convolutional network module architecture 112 (shown in FIG. 10) and a cost function which will be described below.

The convolutional network module architecture 112 includes the following functions: Conv, BatchNorm, Relu, Maxpool, ConvTranspose, and Sigmoid.

Conv is a function that performs convolution which is a simple type of filtering to apply on an input that results in an activation.

BatchNorm is a function to standardize the inputs of a layer in each mini-batch of data in deep neural network training.

ReLu is a non-linear activation function used in building multi-layer neural network This function can be formulated as F(x)=max(0,x) where x is the input.

MaxPool is a function to perform a discretization process using sample-based method in order to down-sample an input representation of an image, and a hidden-layer output matrix. The MaxPool function will reduce the input dimensionality of features contained in the sub-regions binned.

ConvTranspose refers to transposed convolutions which are standard convolutions with a modified input feature map.

Sigmoid is a mathematical function with S-shaped curve characteristics.

Referring to FIGS. 10 and 11, the output of the convolutional neural network architecture 112 is a probability of a pixel in the user image 540 being a hair pixel or not for each pixel in the user image 540, and the cost function is chosen to maximize the IOU (Intersection over union) score on a user image training dataset that has been labeled manually.

The cost function that was used in the training of the convolutional neural network architecture 112 is a mean binary cross-entropy taken over all the pixels of the binary hair mask 542. The cost function is defined by the following equation:

$$L = -\frac{1}{N^2} \sum_{i,j=1}^{N} [x_{ij}\log(p_{ij}) + (1-x_{ij})\log(1-p_{ij})],$$

where N=256, are the values of the ground truth mask, and $p_{ij}$ are the probabilities returned by our model.

Referring to FIGS. 2 and 13, the hair color matching module 92 is provided to generate a list of color shades and associated confidence scores indicating a probability that a hair color of a user matches a color shade associated with a plurality of hair extensions. The hair extensions images associated with the color shades that have an upper range of confidence scores will be displayed for the user to select from.

Referring to FIG. 13, a table 590 indicates sub-groups of colors including black, brown, blonde. In an exemplary embodiment, the black color includes color shades of off-black and jet-black. The brown color includes color shades of mocha brown, dark brown, and ash brown. The blonde color includes color shades of ash blonde, dirty blonde, and sandy blonde.

Referring to FIG. 2, the hair color matching module 92 includes a black shades classifier module 250, a brown shades classifier module 252, a blonde shades classifier module 254, and a comprehensive shades classifier module 256. The black shades classifier module 250 is trained to generate confidence scores associated with black color shades in an image. The brown shades classifier module 252 is trained to generate confidence scores associated with brown color shades in an image. The blonde shades classifier module 254 is trained to generate confidence scores associated with blonde color shades in an image. The comprehensive shades classifier module 256 is trained to generate confidence scores associated with black color shades, brown color shades, and blonde color shades in an image.

Figure 20:
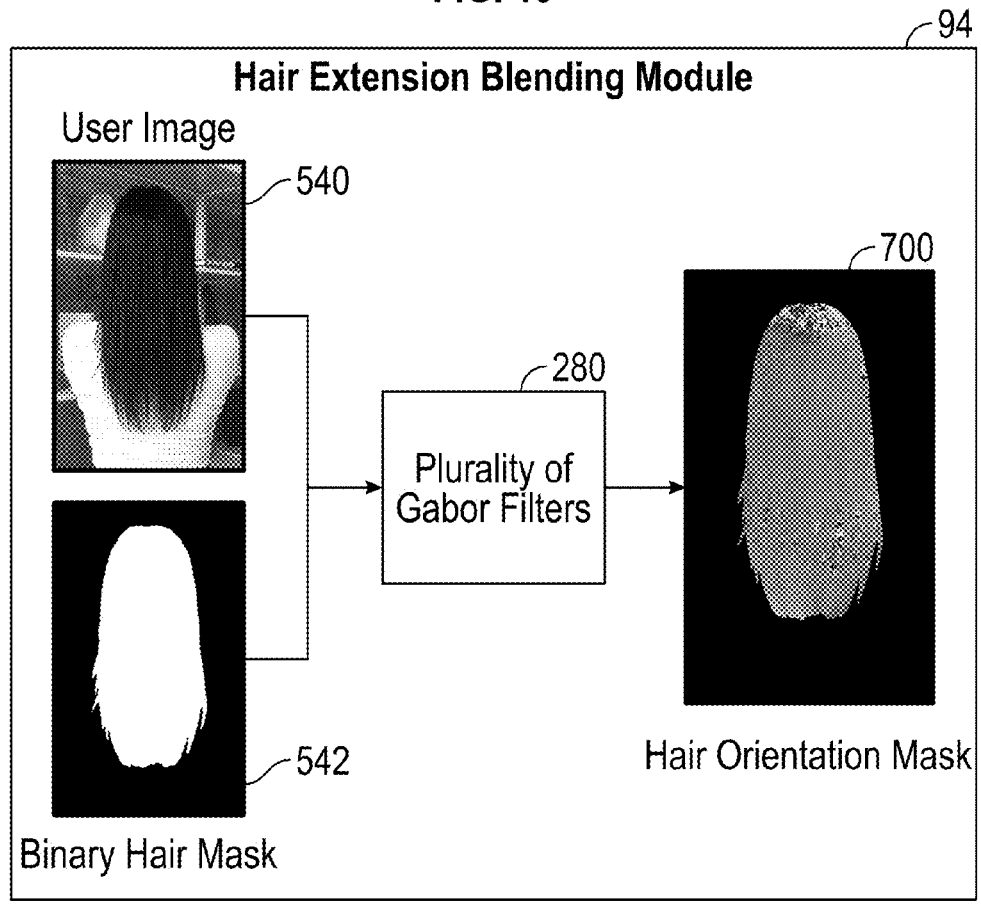
FIG. 20 is a schematic of the user image, the binary hair mask, a plurality of Gabor filters, and a hair orientation mask wherein the hair extension blending module applies the user image and the binary hair mask to the plurality of Gabor filters and generates a hair orientation mask based on the output of the plurality of Gabor filters.

Referring to FIGS. 2 and 20, the hair extension blending module 94 is provided to generate a modified version of a user image 540 (e.g., a final modified user image 820 shown in FIG. 24) that shows how the user hair will look in a realistic way when wearing a selected hair extension having a desired volume, length and color.

Referring to FIG. 20, the hair extension blending module 94 applies the user image 540 and the binary hair mask 542 to the plurality of Gabor filters 280 and generates a hair orientation mask 700 based on the output of the plurality of Gabor filters 280. In an exemplary embodiment, the hair extension blending module 94 applies convolution to the user image 540 and the binary hair mask 542 utilizing 32 Gabor filters. For each hair pixel in the user image 540 and associated pixel in the binary hair mask 542, the module 94 obtains 32 score numbers that are the results of the convolutions. For each hair pixel in the hair orientation mask 700, the module 94 selects the Gabor filter with the highest score and obtains the orientation.

Figure 21:
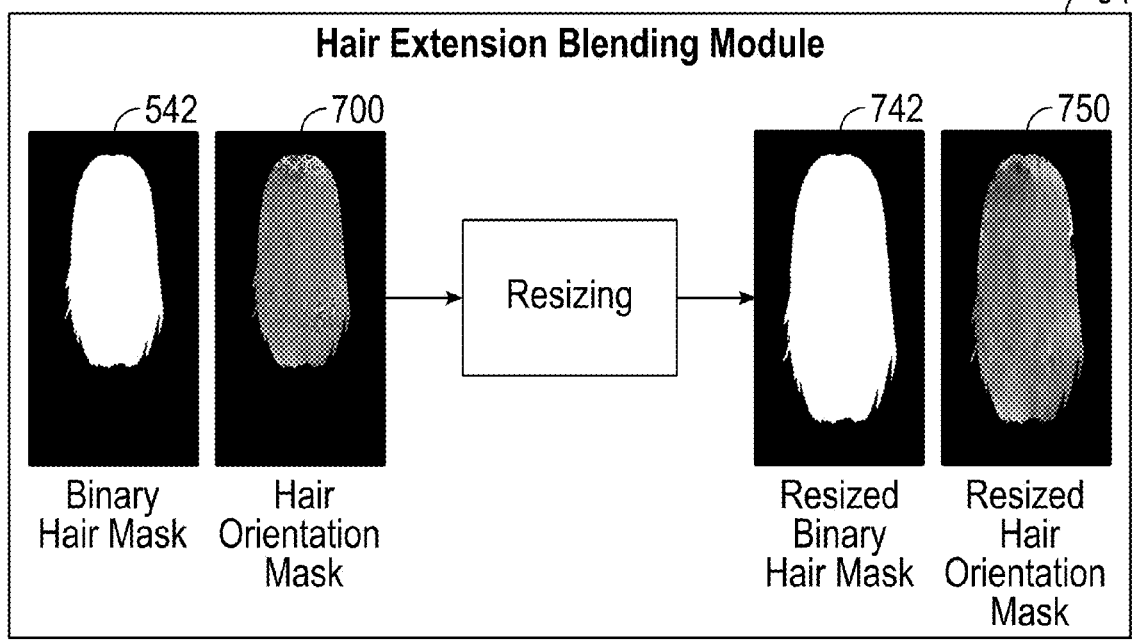
FIG. 21 is a schematic of the binary hair mask, the hair orientation mask, a resized binary hair mask, and a resized hair orientation mask wherein the hair extension blending module generates the resized binary hair mask based on the binary hair mask, and further generates the resized hair orientation mask based on the hair orientation mask.

Referring to FIG. 21, the hair extension blending module 94 generates the resized binary hair mask 742 based on the binary hair mask 542. The resized binary hair mask 742 illustrates a hair mask having a length and a volume that matches a length and a volume of hair in a reference image 770 (shown in FIG. 22) having a selected hair extension. The length of hair in a reference image 770 matches a length and a volume associated with a SKU of the selected hair extension.

The hair extension blending module 94 generates the resized hair orientation mask 750 based on the hair orientation mask 700. The resized hair orientation mask 750 illustrates a hair orientation mask having a length and a volume that matches a length of hair in a reference image 770 (shown in FIG. 22) having a selected hair extension. The length and the volume of hair in a reference image 770 matches a length associated with a SKU of the selected hair extension.

Figure 22:
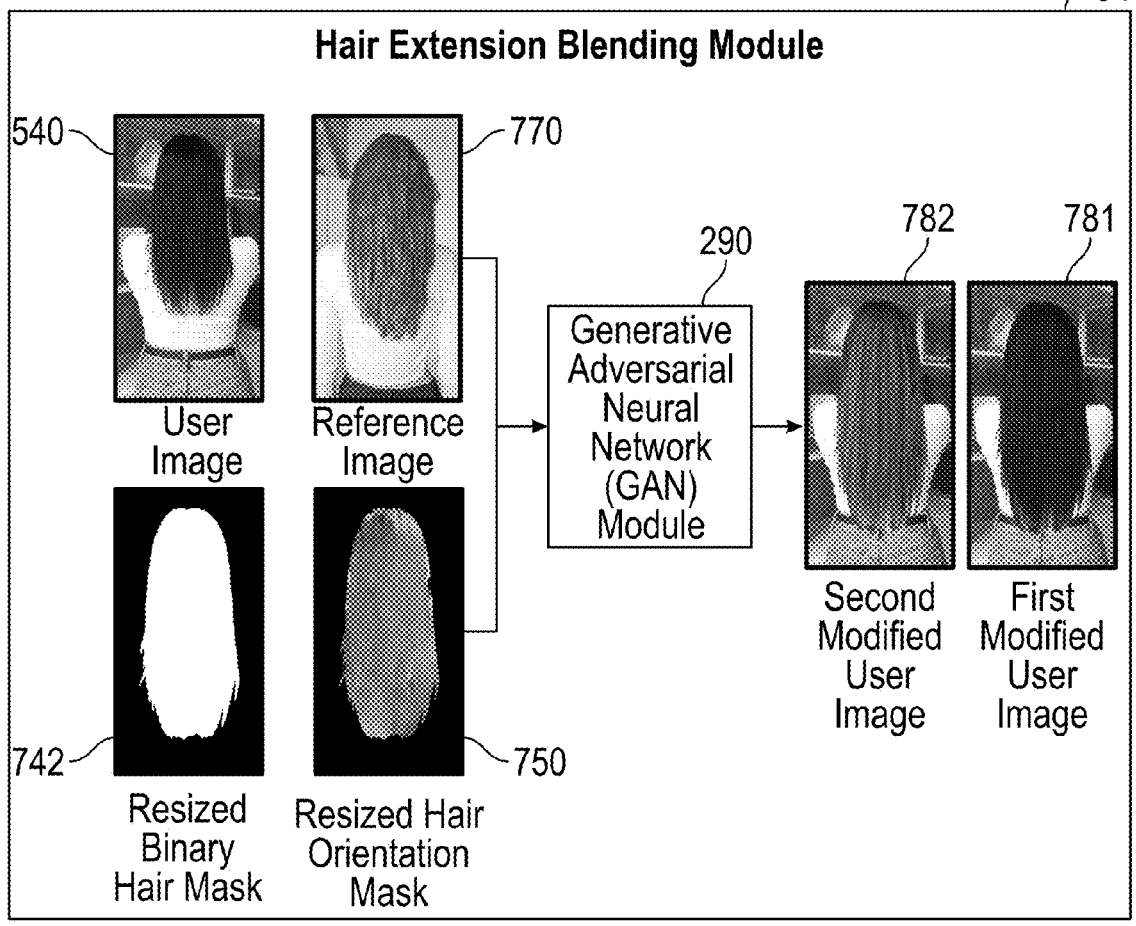
FIG. 22 is a schematic of the user image, a reference image, the resized binary hair mask, the resized hair orientation mask, a generative adversarial neural network module, a first modified user image, and a second modified user image wherein the module utilizes the user image, the reference image, the resized binary hair mask, and the resized hair orientation mask to generate the first modified user image and the second modified user image.

Referring to FIG. 22, the generative adversarial neural network module utilizes the user image 540, the reference image 770, the resized binary hair mask 742, and the resized hair orientation mask 750 to generate the first modified user image 781 and the second modified user image 782. The first modified user image 781 has hair with a color corresponding to a color of the hair in the user image 540 and having the desired length and the desired volume. The second modified user image 782 has hair with a color corresponding to a color of the hair in the reference image 770 and having the desired length and the desired volume. The color of the hair in the reference image 770 is identical to the color of hair associated with the SKU of the selected hair extension.

Figure 23:
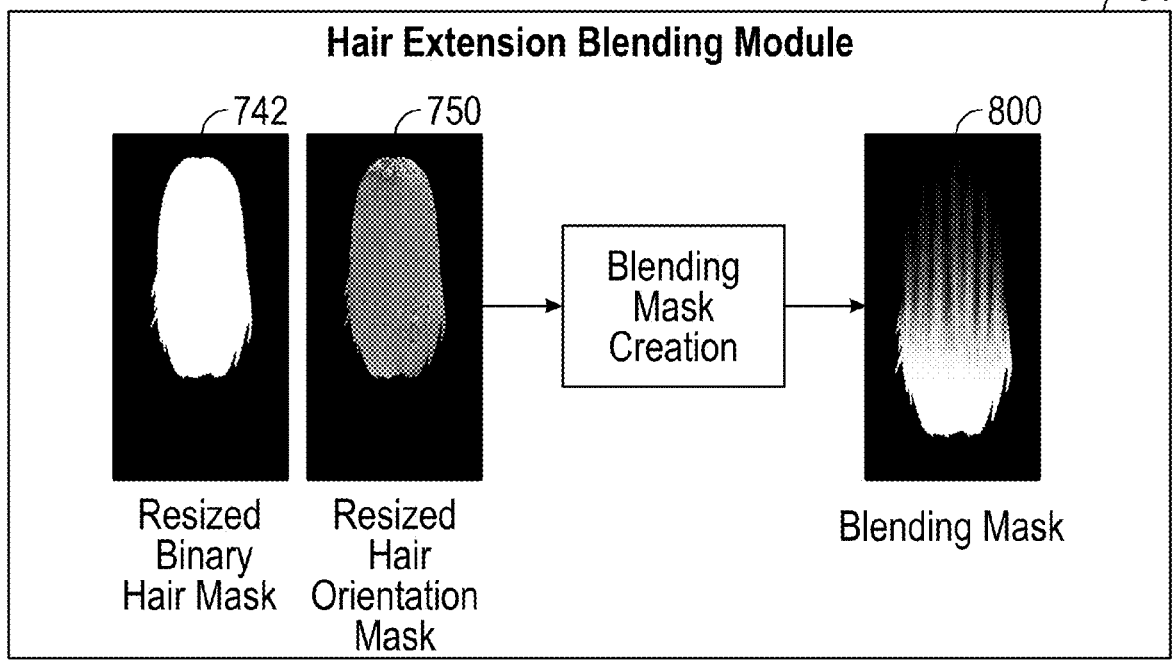
FIG. 23 is a schematic of the resized binary hair mask, the resized hair orientation mask, and a blending mask wherein the hair extension blending module utilizes the resized binary hair mask and the resized hair orientation mask to generate the blending mask.

Referring to FIG. 23, the hair extension blending module 94 utilizes the resized binary hair mask 742 and the resized hair orientation mask 750 to generate the blending mask 800. In particular, the module 94 generates the blending mask 800 by multiplying each pixel of the resized binary hair mask 742 by a corresponding pixel of the resized hair orientation mask 750.

Figure 24:
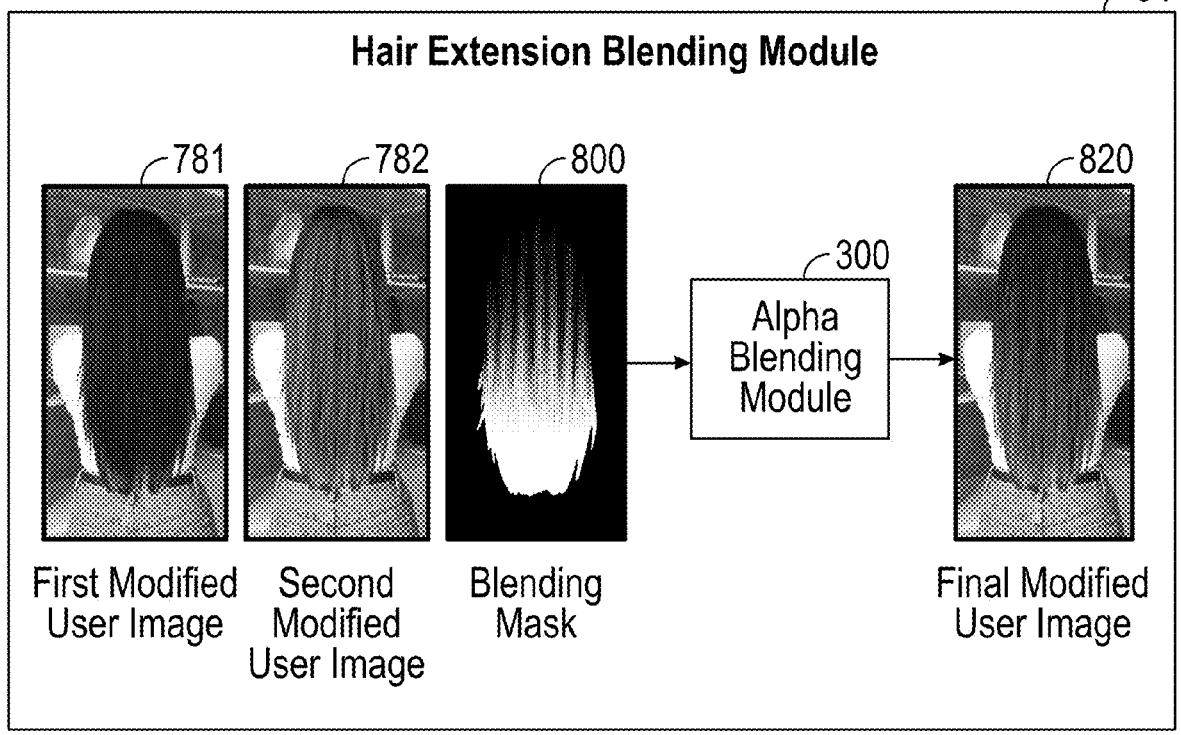
FIG. 24 is a schematic of the first modified user image, the second modified user image, a blending mask, and a final modified user image having a selected hair extension applied thereto wherein the hair extension blending module utilizes an Alpha blending module to generate the final modified user image utilizing the first modified user image, the second modified user image, and the blending mask.

Referring to FIG. 24, the hair extension blending module 94 utilizes an Alpha blending module 300 to generate the final modified user image 820 utilizing the first modified user image 781, the second modified user image 782, and the blending mask 800. In an exemplary embodiment, the hair extension blending module 94 blends the first modified user image 781 and the second modified user image 782 using the following equation:

$$R = I_1 * (1-M) + I_2 * M \qquad (2)$$

where R is the final modified user image, $I_1$ is the first modified user image, $I_2$ is the second modified user image, and M is the blending mask.

Referring to FIGS. 1, 2 and 25-27, the data analytics dashboard module 96 is provided to allow a retailer to view user data associated with the virtual hair extension system 30 obtained from the data analytics database 72 (shown in FIG. 1). In particular, the data analytics dashboard module 96 generates and displays the clicks dashboard 1200 (shown in FIG. 25), the tryouts dashboard 1310 (shown in FIG. 26), and the SKUs dashboard 1410 (shown in FIG. 27) on the display device 56—which will be described in greater detail below.

Referring to FIGS. 1-9, a flowchart of a method for generating a final modified user image 820 having the hair of the user with a selected hair extension thereon utilizing the virtual hair extension system 30 in accordance with another exemplary embodiment will be explained.

At step 400, the computer 60 receives a user image 540 (shown in FIG. 11) of a user having hair from a digital camera 52, and stores the user image 540 in a memory device 52. The computer 60 has a hair segmentation module 90 (shown in FIG. 2), a hair color matching module 92, a hair extension blending module 94, and a data analytics dashboard module 96. After step 400, the method advances to step 402.

At step 402, the hair segmentation module 90 has a convolution neural network module 110 (shown in FIG. 10) that generates the binary hair mask 542 (shown in FIG. 11) utilizing the user image 540. After step 402, the method advances to step 404.

At step 404, the hair segmentation module 90 multiplies each pixel of the user image 540 (shown in FIG. 11) by a corresponding pixel of the binary hair mask 542 to obtain a segmented user hair image 544 (shown in FIG. 11) in an RGB color space. The segmented user hair image 544 illustrates only the hair of the user image 540. After step 404, the method advances to step 406.

At step 406, the hair color matching module 92 generates a segmented user hair image in a HSV color space from the segmented user hair image 544 in the RGB color space. After step 406, the method advances to step 408.

Figure 12:
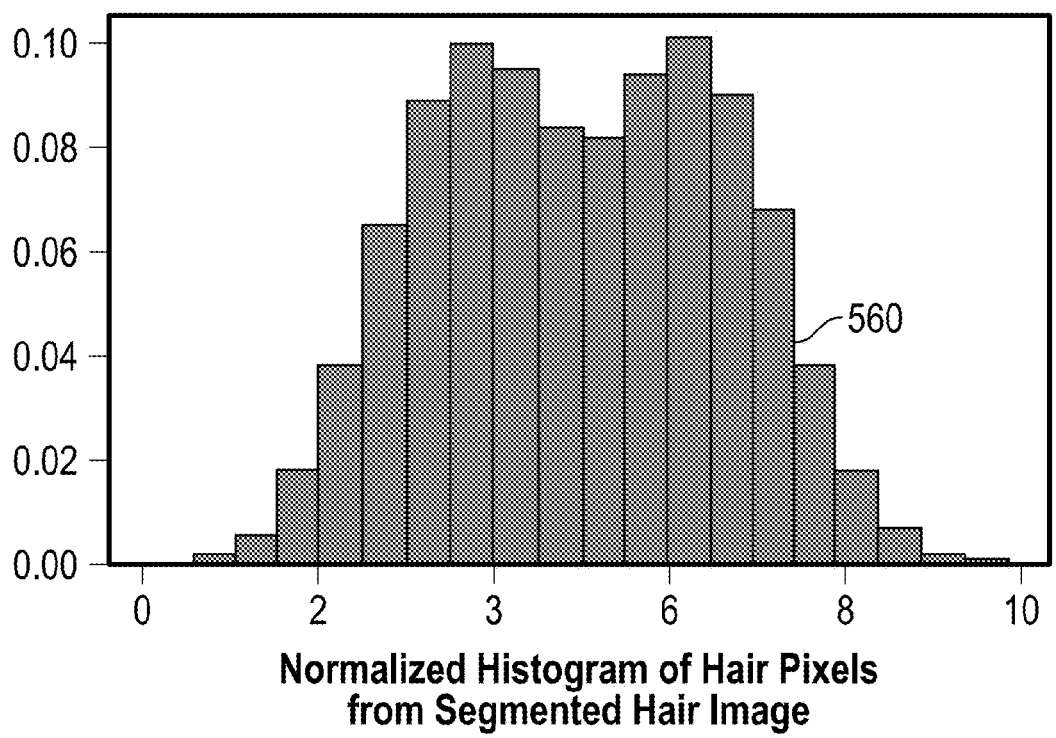
FIG. 12 is a schematic of a normalized histogram of hair pixels generated by the hair color matching module utilizing a segmented user hair image in an HSV color space.
Figure 16:
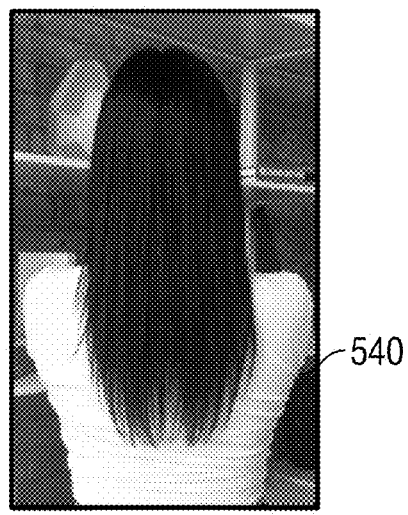
FIG. 16 is a schematic of a user image having a rear view of the head of the user that is utilized by the hair extension blending module.

At step 408, the hair color matching module 92 generates a normalized histogram of hair pixels 560 (shown in FIG. 12) from the segmented user hair image in the HSV color space. In an exemplary embodiment, all of the hair pixels of the segmented user hair image in the HSV color space are put into a normalized histogram of size 32*32*32 containing 32678 features totally. Every bin of the normalized histogram of hair pixels 560 contains the number of hair pixels with their values in the corresponding region, divided by the total number of hair pixels in the user image. The system utilizes the normalization step for consistency since every user image has a different size of binary hair mask. After step 408, the method advances to step 410.

At step 410, the computer 60 makes a determination as to whether the normalized histogram of hair pixels 560 indicates hair pixels having one of a plurality of predefined colors (e.g., pink, blue, green). In particular, a set of predefined special colors such as pink, blue, green that do not belong to the specified color sub-groups that the system needs to match against will be detected using a binary classification method. The binary classification method can use supervised machine learning techniques such as Support Vector Machine, Random Forests, Catboost or a neural network for example. The entire normalized histogram of hair pixels 560 will be used as an input to the binary classification method. If the value of step 410 equals "yes", the user image 540 is deleted and the method returns to step 400. Otherwise, the method advances to step 412.

At step 412, the hair color matching module 92 selects hair pixels in a selected set of most populated bins in the normalized histogram of hair pixels 560 to obtain a compressed histogram of hair pixels. For purposes of understanding, a complete histogram of hair pixels of the segmented user hair image in the HSV color space has many non-relevant values. In particular, the specified color sub-groups cover only a small part of a complete histogram, so many values of a complete histogram are not relevant. In an exemplary embodiment, the hair color matching module 92 selects the most filled 5% bins out of the total bins in a histogram of hair pixels so that actual color shades of hair will be more accurately determined. Using this technique, the module 92 corrects for small errors in the generation of the segmented user hair image. For example, if a part of skin, clothes, or background was inadvertently classified as hair in the segmented user hair image, it will not affect the final color matching list, since these pixels will be ignored. After step 412, the method advances to step 420.

At step 420, the computer 60 makes a determination as to whether the user will manually select a color sub-group (e.g., black, brown, blonde) indicating their hair color. This determination can be based on a stored software flag in the memory device 52 for example. If the value of step 420 equals "yes", the method advances to step 422. Otherwise, the method advances to step 440.

At step 422, the hair color matching module 92 displays a GUI 600 (shown in FIG. 14) on the display device 56 and receives a user input from an input device 50 indicating a first color sub-group (e.g., black, brown, blonde) of their hair. After step 422, the method advances to step 424.

At step 424, the hair color matching module 92 selects one of a black shades classifier module 250 (shown in FIG. 2), a brown shades classifier module 252, and a blonde shades classifier module 254 (which is a selected shades classifier module) based on the selected color sub-group. The selected shades classifier module determines a plurality of confidence scores associated with a plurality of color shades. Each confidence score indicates a probability that a color of hair in the segmented user hair image in the HSV color space matches a color shade associated with the selected shades classifier module and further associated with a plurality of hair extensions. After step 424, the method advances to step 426.

At step 426, the hair color matching module 92 sorts a list of the plurality of color shades based on the plurality of confidence scores from a respective color shade thereof having a highest confidence score to a respective color shade thereof having a lowest confidence score. After step 426, the method advances to step 428.

At step 428, the computer 60 stores the list of the plurality of color shades and the associated plurality of confidence scores in a memory device 52 such that each color shade thereof has a respective confidence score thereof. After step 428, the method advances to step 440.

At step 440, the computer 60 makes a determination as to whether the computer 60 will automatically determine a color shade of hair in the user image 540. This determination can be based on a stored software flag in the memory device 52 for example. If the value of step 440 equals "yes", the method advances to step 442. Otherwise, the method advances to step 460.

At step 442, the hair color matching module 92 selects a comprehensive shades classifier module 256 for all specified color shades of all specified color sub-groups (e.g., black, brown, blonde). The comprehensive shades classifier module 256 determines a plurality of confidence scores associated with a plurality of color shades. Each confidence score indicates a probability that a color of hair in the segmented user hair image in the HSV color space matches a color shade associated with the comprehensive shades classifier module 256 and further associated with a plurality of hair extensions. After step 442, the method advances to step 444.

At step 444, the hair color matching module 92 sorts a list of the plurality of color shades based on the plurality of confidence scores from a respective color shade thereof having a highest confidence score to a respective color shade thereof having a lowest confidence score. After step 444, the method advances to step 446.

At step 446, the hair color matching module 92 stores the list of the plurality of color shades and the associated plurality of confidence scores in the memory device 52 such that each color shade thereof has a respective confidence score thereof. After step 446, the method advances to step 448.

Figure 19:
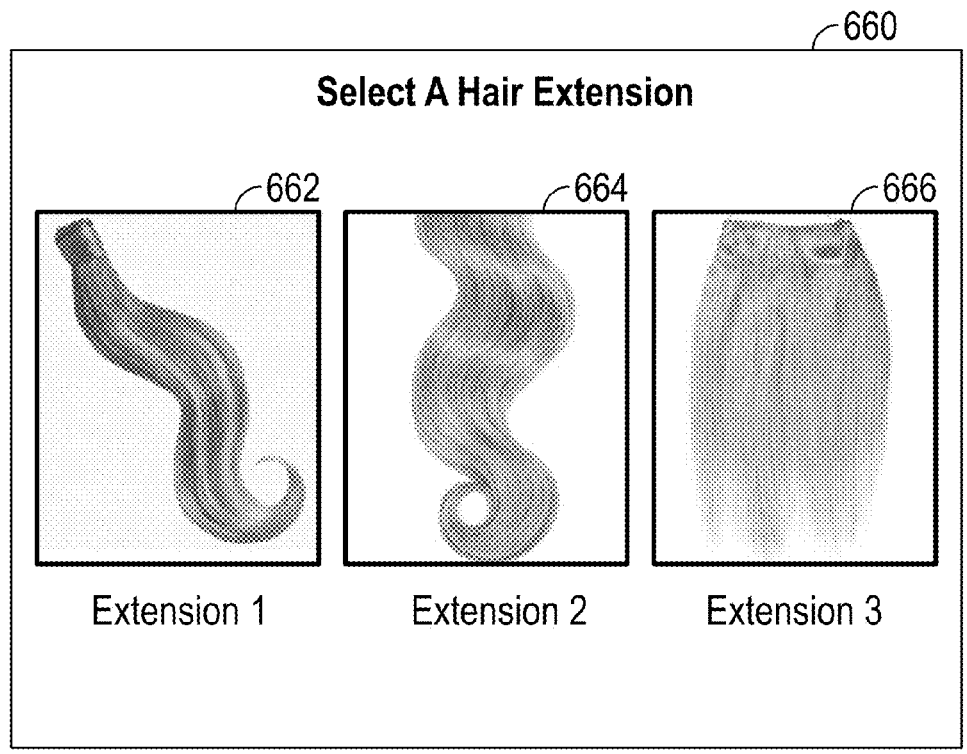

At step 448, the computer 60 displays hair extension images (e.g., hair extension images shown in FIG. 19) associated with a subset of the plurality of hair extensions on the display device 56. Each hair extension image corresponds to a respective hair extension having a respective SKU. The subset of the plurality of hair extensions have color shades with confidence scores within an upper range of the plurality of confidence scores. After step 448, the method advances to step 460.

At step 460, the computer 60 receives a user selection of a selected hair extension corresponding to one of the hair extension images from the input device 50 and determines an associated SKU. The SKU indicates the selected hair extension from the subset of the plurality of hair extensions. After step 460, method advances to step 462.

At step 462, the computer 60 retrieves data associated with the SKU from a hair extension database 70 (shown in FIG. 1) utilizing the Internet 32. The data includes a color, a length, a volume, a price, and a selected hair extension image of the selected hair extension. After step 462, the method advances to step 464.

At step 464, the hair extension blending module 94 applies convolution to the binary hair mask 542 and the user image 540 utilizing a plurality of Gabor filters 280 (shown in FIG. 20) which output a plurality of score numbers for each pixel. The hair extension blending module 94 selects a highest score of the plurality of score numbers for each pixel to generate the hair orientation mask 700 (shown in FIG. 20). The hair orientation mask 700 indicates the orientation of the hair in the user image 540. After step 464, the method advances to step 466.

At step 466, the computer 60 makes a determination as to whether the user image 540 is a frontal image of the user. In an exemplary embodiment, the computer 60 applies face detection using open source face detectors such as Opencv or Dlib to verify if the user image is a frontal image. Further, the computer 60 determines a plurality of 2D landmarks 622 (e.g., shown in FIG. 15) using the open source facial landmarks detector such as Dlib or Opencv. If the value of step 466 equals "yes", the method advances to step 468. Otherwise, method advances to step 470.

At step 468, the hair extension blending module 94 determines a scale of the user image 540 by utilizing 2D landmarks on the user image 540 to determine a number of pixels between both eyes of the user in the user image 540, and then dividing the number of pixels between both eyes by a predetermined eye separation distance.

For example, referring to FIG. 15, the user image 620 comprises a frontal image and includes a plurality of 2D landmarks 622 on the face of the user. The plurality of 2D landmarks 622 includes landmarks 624, 626 indicating a location of a center point on a first eye and a center point on a second eye of the user, respectively. In this example, the module 94 determines a number of pixels between the landmarks 624, 626 and then divides the number of pixels by a predetermined eye separation distance to determine the scale of the user image 620. In an exemplary embodiment, the predetermined eye separation distance corresponds to an average distance that humans have between two eyes (in inches).

After step 468, the method advances to step 470.

At step 470, the computer 60 makes a determination as to whether the user image 540 is a rear image of the user. In an exemplary embodiment, the computer 60 applies face detection using open source face detectors such as Opencv or Dlib to verify if the user image is a rear image. If the value of step 470 equals "yes", the method advances to step 472. Otherwise, the method advances to step 474.

Figure 17:
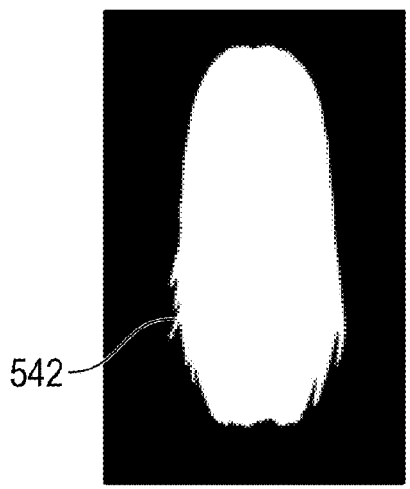
FIG. 17 is a schematic of a binary hair mask that is utilized by the hair extension blending module.

At step 472, the hair extension blending module 94 determines a scale of the user image 540 by obtaining an upper quarter region 640 (shown in FIG. 17) of the binary hair mask 542 (shown in FIG. 17) and determines a number of pixels across the upper quarter region 640 of the binary hair mask 542, and then divides the number of pixels across the upper quarter region 640 of the binary hair mask 542 by a predetermined head width. In an exemplary embodiment, the predetermined head width corresponds to an average head width distance that humans have in inches. After step 472, the method advances to step 474.

At step 474, the hair extension blending module 94 determines an estimated hair length of the hair of the user by generating a bounding box around the binary hair mask 542 (shown in FIG. 17) and determines a pixel height of the bounding box to determine a pixel hair length, and then divides the pixel hair length by a scale of the user image 540. After step 474, the method advances to step 476.

At step 476, the hair extension blending module 94 generates a resized binary hair mask 742 utilizing the binary hair mask 542, the estimated hair length, and a desired length and a desired volume associated with the SKU of the selected hair extension. The resized binary hair mask 742 has the desired length and the desired volume. In particular, the hair extension blending module 94 utilizes the OpenCV resize function to generate the resized binary hair mask 742 utilizing the binary hair mask 542, the estimated hair length, and a desired length associated with the SKU of the selected hair extension. After step 476, the method advances to step 478.

At step 478, the hair extension blending module 94 generates a resized hair orientation mask 750 (shown in FIG. 21) utilizing the hair orientation mask 700, the estimated hair length, and a desired length and a desired volume associated with the SKU of the selected hair extension. The resized hair orientation mask 750 has the desired length and the desired volume associated with the SKU of the selected hair extension. In particular, the hair extension blending module 94 utilizes the OpenCV resize function to generate the resized hair orientation mask 750 utilizing the hair orientation mask 700, the estimated hair length, and a desired length and a desired volume associated with the SKU of the selected hair extension. After step 478, the method advances to step 480.

At step 480, the hair extension blending module 94 has a generative adversarial neural network module 290 that generates a first modified user image 781 (shown in FIG. 22) and a second modified user image 782 utilizing the user image 540, the reference image 770, the resized binary hair mask 742, and the resized hair orientation mask 750. The first modified user image 781 has hair with a color corresponding to a color of the hair in the user image 540, and has the desired length and the desired volume. The second modified user image 782 has hair with a color corresponding to a color of the hair in the reference image 770, and has the desired length and the desired volume. The color of hair in the reference image 770 is identical to a color of hair associated with the SKU of the selected hair extension. After step 480, the method advances to step 490.

At step 490, the hair extension blending module 94 generates a blending mask 800 (shown in FIG. 23) by multiplying each pixel of the resized binary hair mask 742 (shown in FIG. 23) by a corresponding pixel of the resized hair orientation mask 750. After step 490, the method advances to step 492.

At step 492, the hair extension blending module 94 has an Alpha blending module 300 (shown in FIG. 24) that blends the first modified user image 781, the second modified user image 782, and the blending mask 800 to obtain a final modified user image 820 (shown in FIG. 24) having the hair of the user with the selected hair extension thereon. In an exemplary embodiment, the hair extension blending module 94 blends the first modified user image 781 and the second modified user image 782 using the following equation:

$$R = I_1 * (1-M) + I_2 * M \qquad (2)$$

where R is the final modified user image, $I_1$ is the first modified user image, $I_2$ is the second modified user image, and M is the blending mask.

After step 492, the method advances to step 494.

At step 494, the computer 60 displays the final modified user image 820 (shown in FIG. 24) on the display device 56. After step 494, the method advances to step 496.

At step 496, the computer 60 stores the final modified user image 820 in the memory device 52. After step 496, the method advances to step 498.

At step 498, the data analytics dashboard module 96 receives a user dashboard selection from an input device 50. After step 498, the method advances to step 500.

At step 500, the computer 60 retrieves data for at least one of a clicks dashboard 1200 (shown in FIG. 25), a tryouts dashboard 1310 (shown in FIG. 26), and a SKUs dashboard 1410 (shown in FIG. 27) associated with the plurality of hair extensions from a data analytics database 1672, based on the user dashboard selection, utilizing the Internet 32. At step 500, the method advances to step 502.

At step 502, the computer 60 displays at least one of the clicks dashboard 1200, the tryouts dashboard 1310, and the SKUs dashboard 1410 and the retrieved data on the display device 56.

Figure 25:
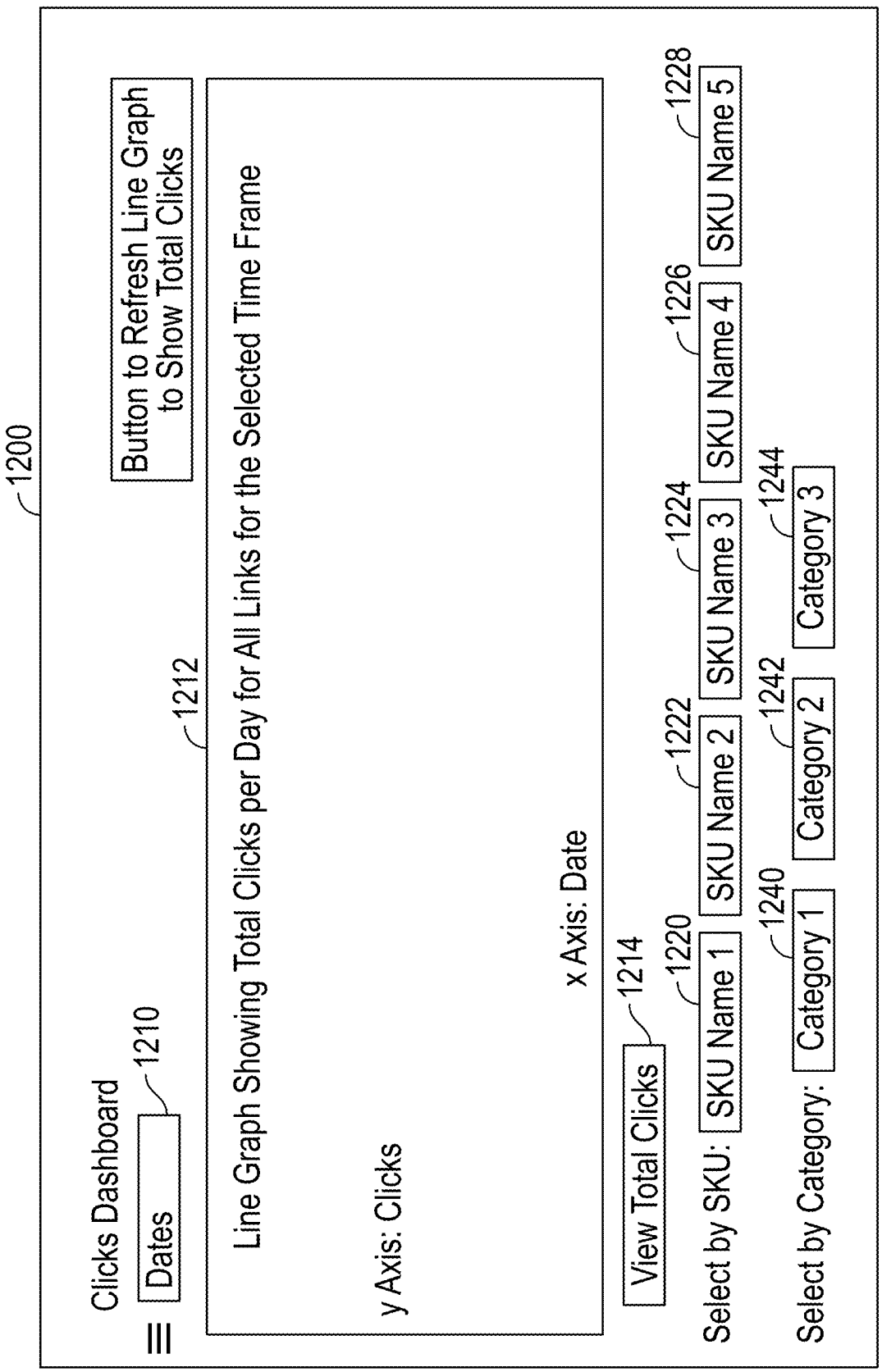
FIG. 25 is a schematic of a clicks dashboard that is generated by the data analytics dashboard module.

Referring to FIG. 25, the clicks dashboard 1200 is provided to display clicks information associated with users who have clicked on selected hair extensions. The clicks dashboard 1200 includes a date selection box 1210, a line graph 1212, a view total clicks selection icon 1214, SKU name selection icons 1220, 1222, 1224, 1226, 1228, a first category icon 1240, a second category icon 1242, and a third category icon 1244.

During operation, the date selection box 1210 allows a retailer to select dates for retrieving clicks information associated with clicks that occurred within the selected dates.

The line graph 1212 illustrates clicks per day for selected SKUs or categories for the selected dates.

When the view total clicks selection icon 1214 is selected, the total number of clicks for a SKU or a category is displayed on the line graph 1212 for the selected dates.

Further, when the SKU name selection icon 1220 is selected, the number of clicks associated with a first product is displayed on the line graph 1212 when the icon 1214 is subsequently selected. Further, when the SKU name selection icon 1222 is selected, the number of clicks associated with a second product is displayed on the line graph 1212 when the icon 1214 is subsequently selected. Also, when the SKU name selection icon 1224 is selected, the number of clicks associated with a third product is displayed on the line graph 1212 when the icon 1214 is subsequently selected. Further, when the SKU name selection icon 1226 is selected, the number of clicks associated with a fourth product is displayed on the line graph 1212 when the icon 1214 is subsequently selected. Also, when the SKU name selection icon 1228 is selected, the number of clicks associated with a fifth product is displayed on the line graph 1212 when the icon 1214 is subsequently selected.

Further, when the first category icon 1240 is selected, the number of clicks associated with a first category of products to be displayed on the line graph 1212 when the icon 1214 is subsequently selected.

Further, when the second category icon 1242 is selected, the number of clicks associated with a second category of products is displayed on the line graph 1212 when the icon 1214 is subsequently selected.

Still further, when the third category icon 1244 is selected, the number of clicks associated with a third category of products is displayed on the line graph 1212 when the icon 1214 is subsequently selected.

Figure 26:
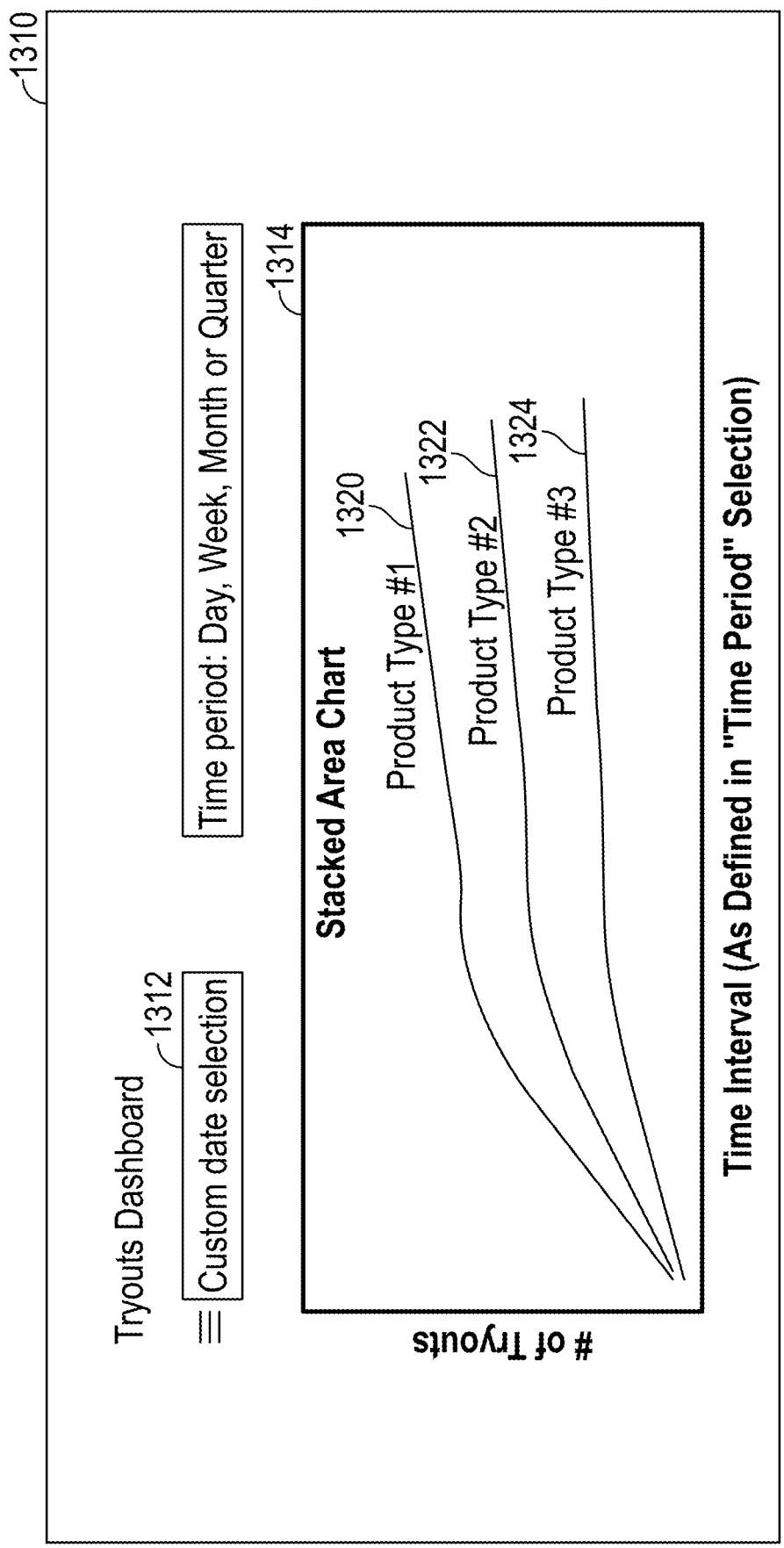
FIG. 26 is a schematic of a tryouts dashboard that is generated by the data analytics dashboard module.

Referring to FIG. 26, the tryouts dashboard 1310 is provided to display graphs associated with selected hair extension products in which the users have virtually tried out the selected products. A user has a virtual tryout of the selected product when a final modified user image is displayed for the user. The tryouts dashboard 1310 includes a custom dates selection box 1312 and a stacked area chart 1314.

During operation, the custom dates selection box 1312 allows a retailer to select dates for retrieving virtual tryout data associated with virtual tryouts of selected products within the selected dates.

The stacked area chart 1314 includes graphs indicating the number of virtual tryouts for selected products. For example, the stacked area chart 1314 includes a graph 1320 indicating the number of virtual tryouts for a first product over a time frame. Further, the stacked area chart 1314 includes a graph 1322 indicating the number of virtual tryouts for a second product over the time frame. Further, the stacked area chart 1324 includes a graph 1324 indicating the number of virtual tryouts for a third product over the time frame.

Referring to FIG. 27, the SKUs dashboard 1410 is provided to display data associated with selected hair extension products identified by the SKU names. The SKUs dashboard 1410 includes a custom dates selection box 1412, SKU records 1420, 1422, 1424, 1426, 1428, 1430, and an export file selection icon 1500.

During operation, the custom dates selection box 1412 allows a retailer to select dates for retrieving data associated with selected products identified by the SKU names within the selected dates. The export file selection icon 1500 allows a retailer to save the retrieved data to an electronic file.

The SKU record 1420 is associated with a first product and includes the following information: (i) SKU name associated with the first product, (ii) number of clicks to view the first product by users, (iii) number of virtual tryouts of the first product by users, and (iv) the percentage conversion rate of users purchasing the first product.

The SKU record 1422 is associated with a second product and includes the following information: (i) SKU name associated with the second product, (ii) number of clicks to view the second product by users, (iii) number of virtual tryouts of the second product by users, and (iv) the percentage conversion rate of users purchasing the second product.

The SKU record 1424 is associated with a third product and includes the following information: (i) SKU name associated with the third product, (ii) number of clicks to view the third product by users, (iii) number of virtual tryouts of the third product by users, and (iv) the percentage conversion rate of users purchasing the third product.

The SKU record 1426 is associated with a fourth product and includes the following information: (i) SKU name associated with the fourth product, (ii) number of clicks to view the fourth product by users, (iii) number of virtual tryouts of the fourth product by users, and (iv) the percentage conversion rate of users purchasing the fourth product.

The SKU record 1428 is associated with a fifth product and includes the following information: (i) SKU name associated with the fifth product, (ii) number of clicks to view the fifth product by users, (iii) number of virtual tryouts of the fifth product by users, and (iv) the percentage conversion rate of users purchasing the fifth product.

The SKU record 1430 is associated with a sixth product and includes the following information: (i) SKU name associated with the sixth product, (ii) number of clicks to view the sixth product by users, (iii) number of virtual tryouts of the sixth product by users, and (iv) the percentage conversion rate of users purchasing the sixth product.

Figure 28:
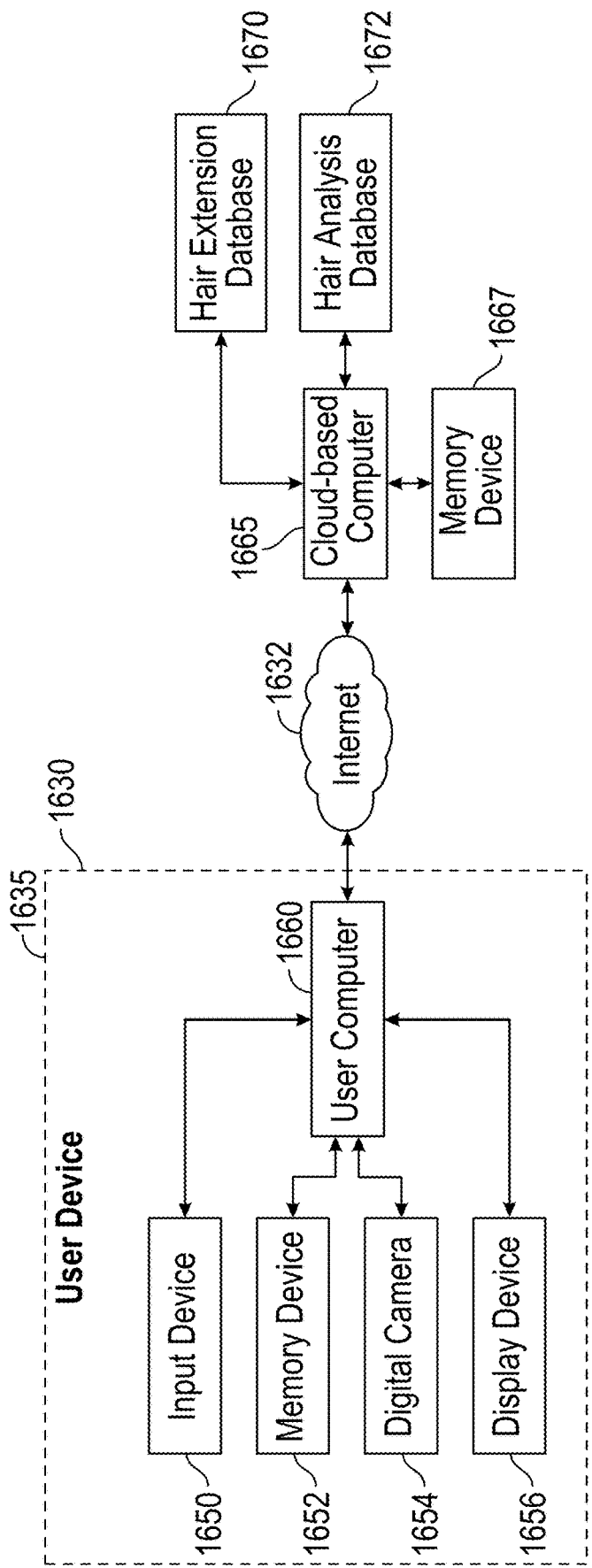
FIG. 28 is a block diagram of another virtual hair extension system in accordance with another exemplary embodiment.
Figure 29:
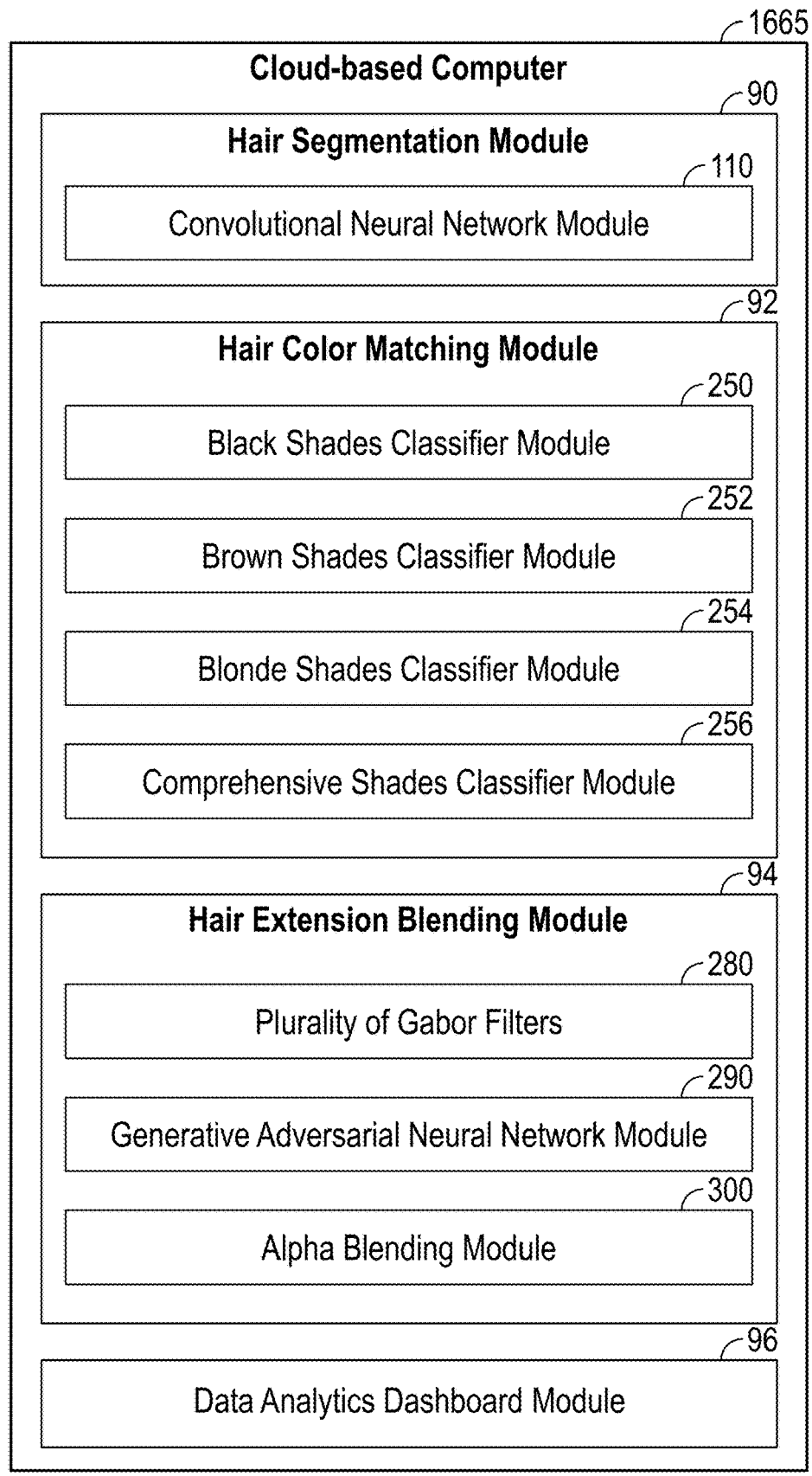
FIG. 29 is a block diagram of a cloud-based computer utilized by the virtual hair extension system of FIG. 28 having a hair segmentation module, a hair color matching module, a hair extension blending module, and a data analytics dashboard module.
Figure 30:
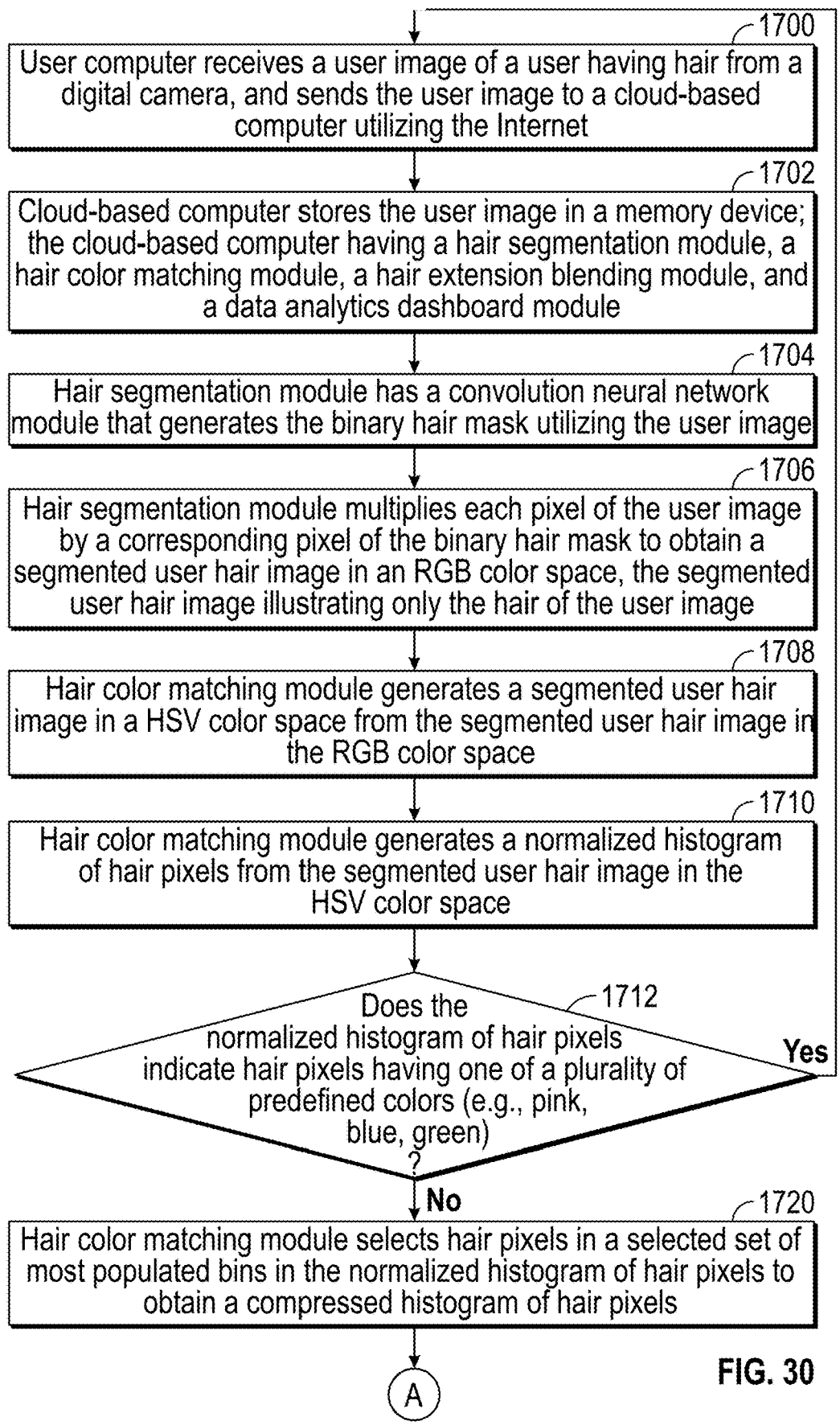
FIGS. 30-36 are a flowchart of a method for generating a final modified user image having the hair of the user with a selected hair extension thereon utilizing the virtual hair extension system of FIG. 28 in accordance with another exemplary embodiment.
Figure 31:
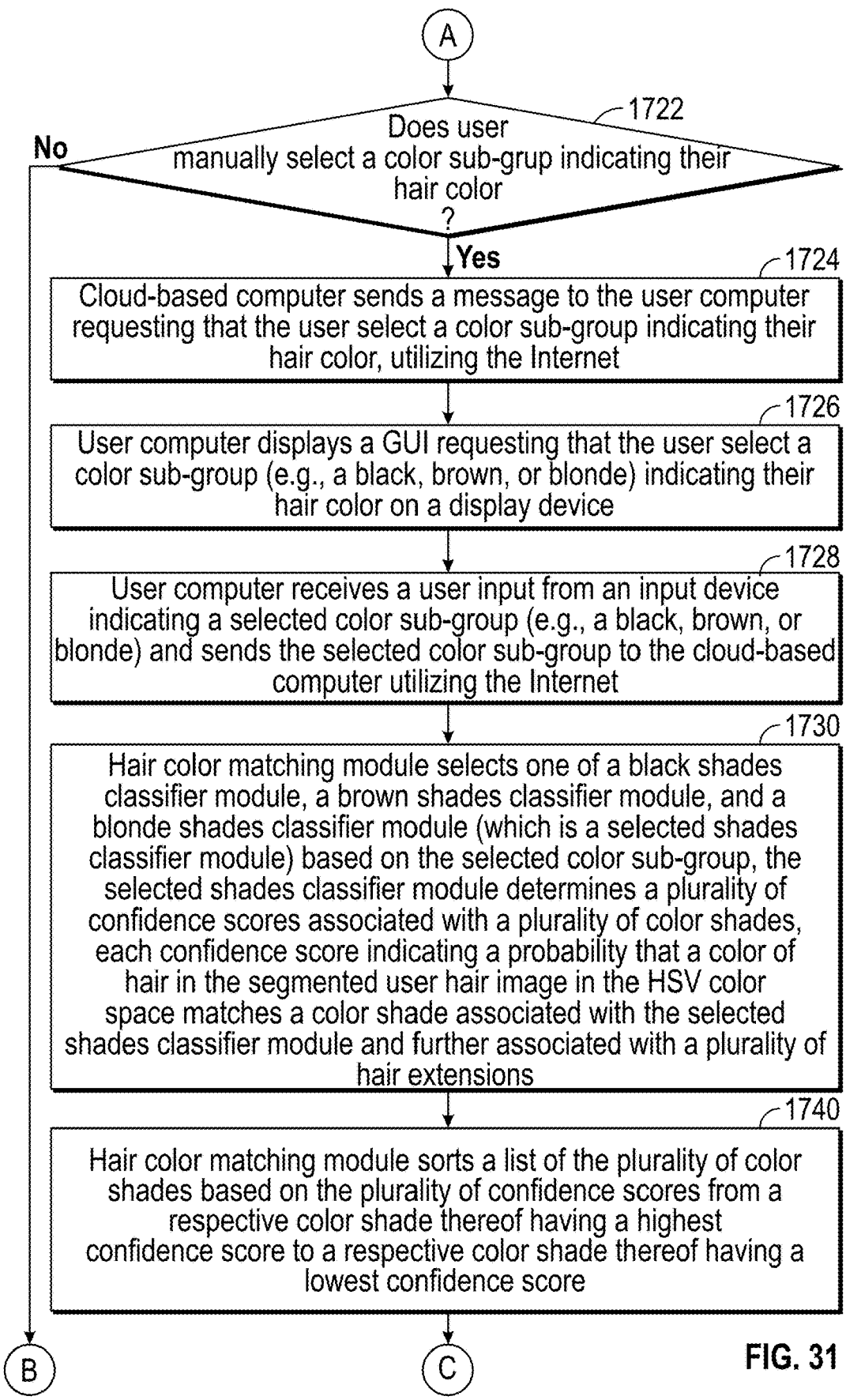
Figure 32:
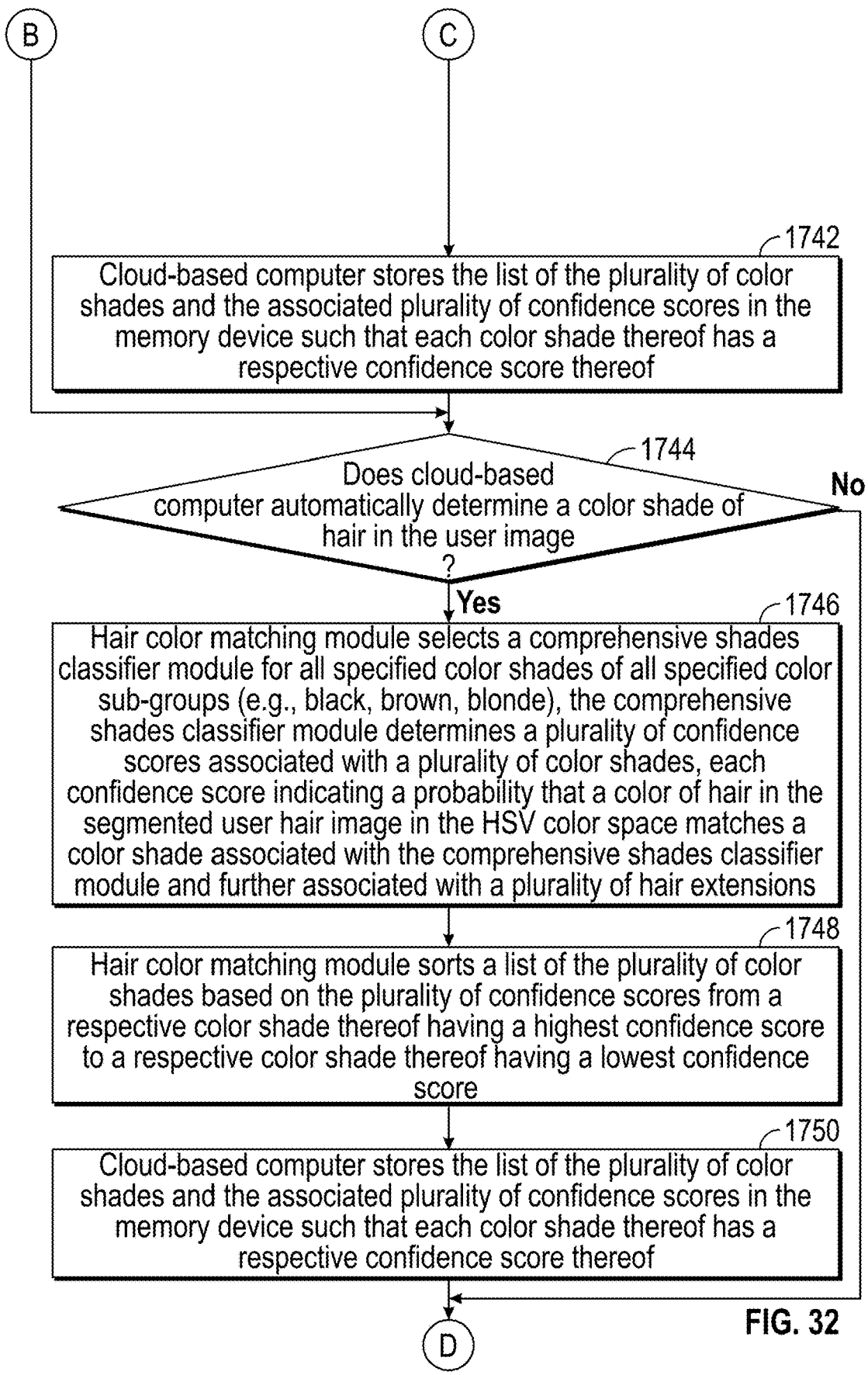
Figure 33:
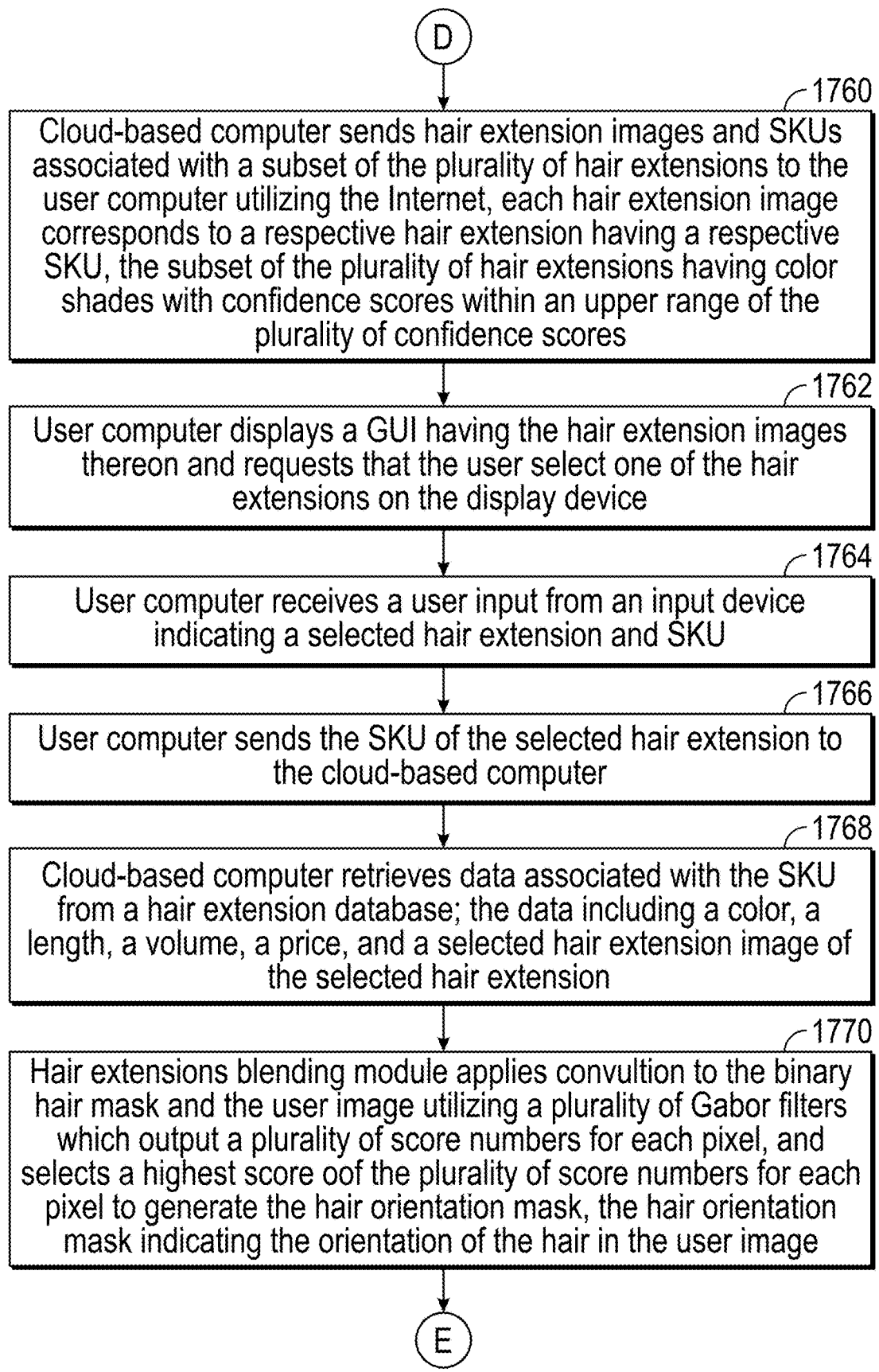
Figure 34:
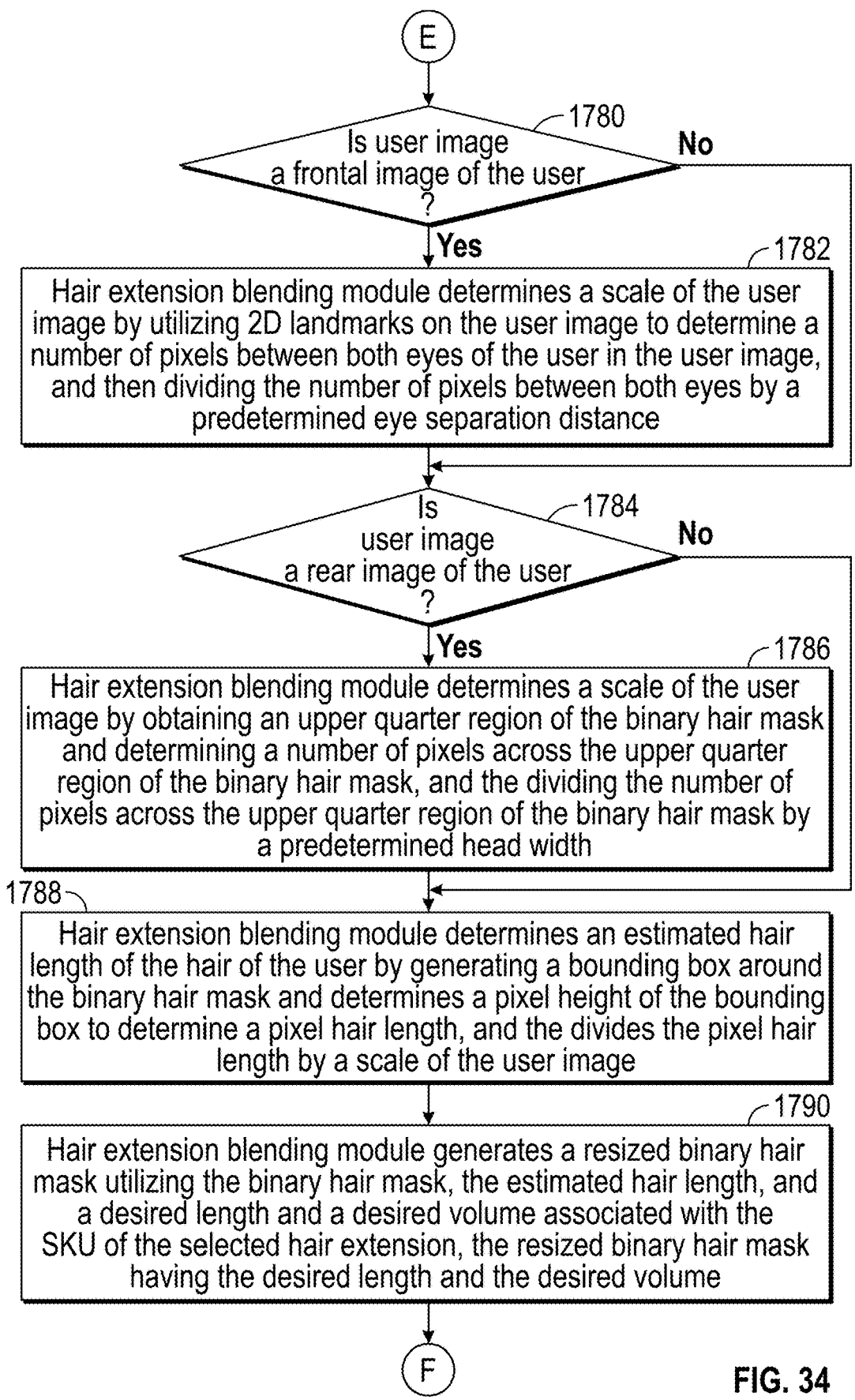
Figure 35:
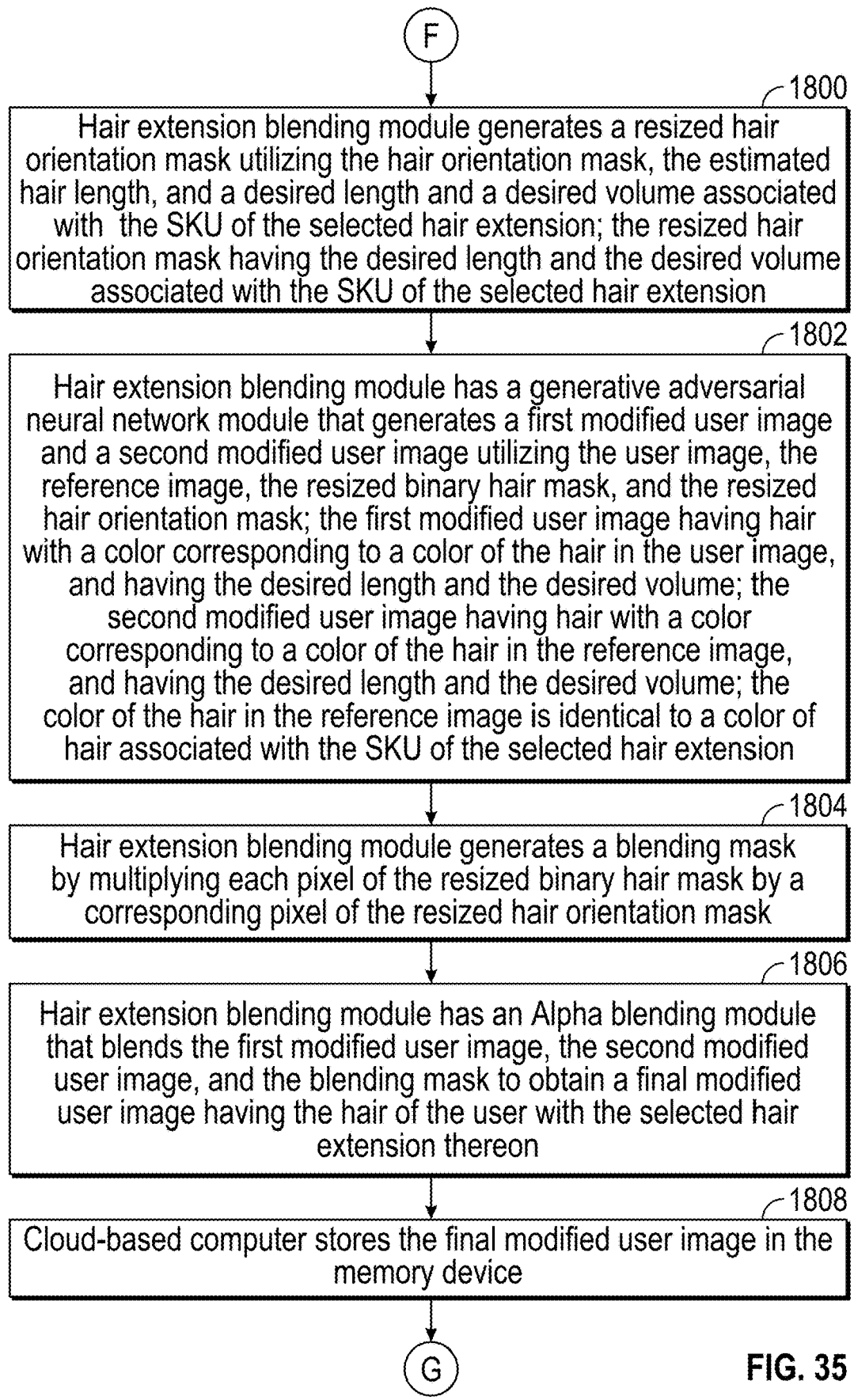
Figure 36:
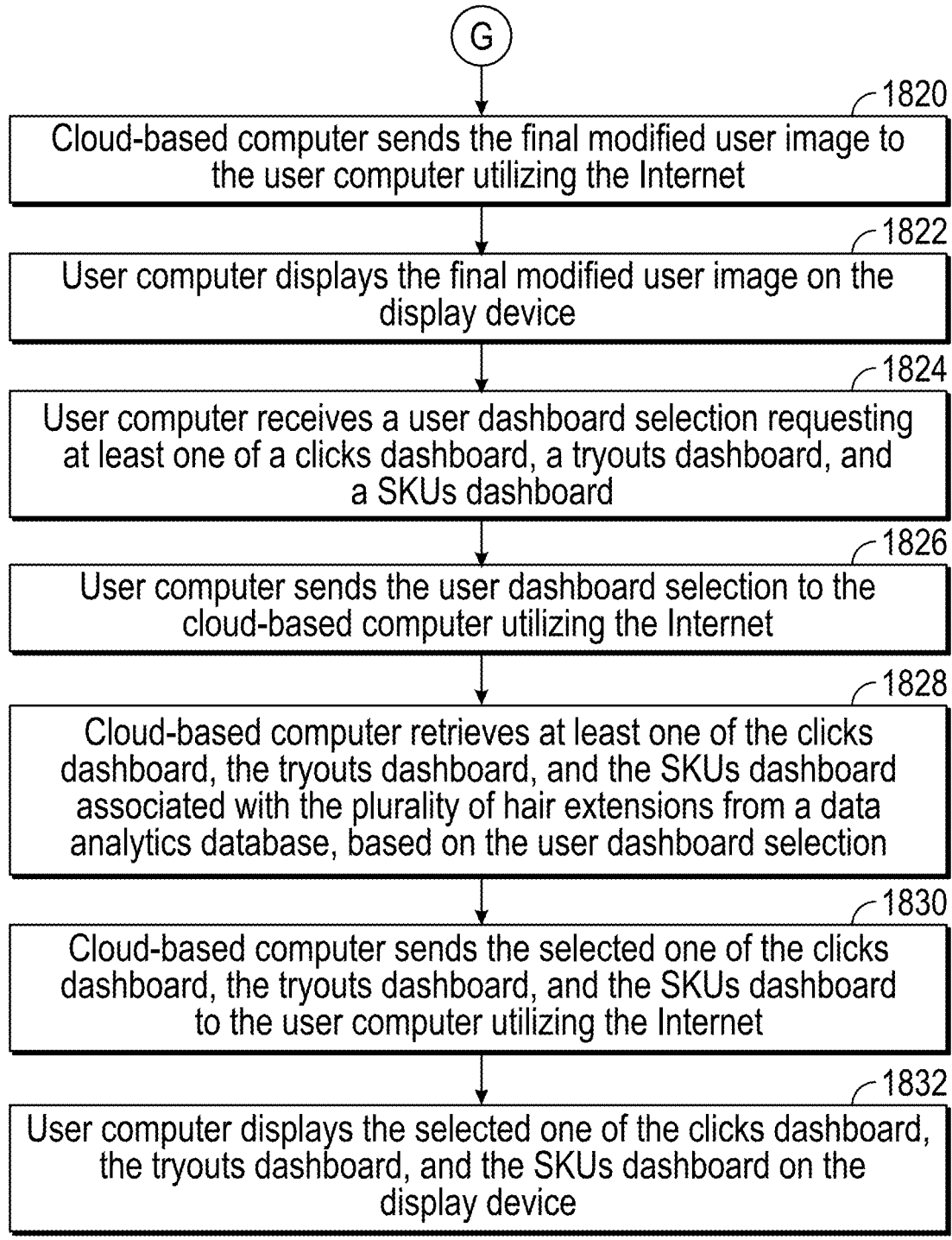

Referring to FIGS. 28 and 29, a virtual hair extension system 1630 that allows a user to virtually try on a selected hair extension is illustrated. The virtual hair extension system 1630 is operably coupled to the Internet 1632 as shown. The virtual hair extension system 1630 includes a user device 1634 having an input device 1650, a memory device 1652, a digital camera 1654, a display device 1656, a user computer 1660, a hair extension database 1670, and a data analytics database 1672. The hair extension database 1670 is identical to the hair extension database 1670 discussed above. Further, the data analytics database 1672 is identical to the data analytics database 72 discussed above.

The input device 1650 is provided to receive user input for implementing the associated methods described herein. The input device 1650 is operably coupled to the user computer 1660 and communicates with the user computer 1660.

The memory device 1652 is provided to store data utilized by the user computer 1660. The memory device 1652 is operably coupled to the user computer 1660 and communicates with the user computer 1660.

The digital camera 1654 is provided to generate a user image of a person having hair and to send the user image to the user computer 1660. The digital camera 1654 is operably coupled to the user computer 1660 and communicates with the user computer 1660.

The display device 1656 is provided to display graphical user interfaces and images in response to display instructions received from the user computer 1660. The display device 1656 is operably coupled to the user computer 1660 and communicates with the user computer 1660.

The user computer 1660 operably communicates with the cloud-based computer 1665 utilizing the Internet 1632.

The cloud-based computer 1665 is provided to implement at least a portion of the associated methods described herein. The cloud-based computer 1665 is operably coupled to the Internet 32, the hair extension database 1670, the data analytics database 1672, and the memory device 1667. The user computer 1660 communicates with the hair extension database 70 and the data analytics database 72. The memory device 1667 is provided to store data utilized by the cloud-based computer 1665.

The cloud-based computer 1665 includes the hair segmentation module 90, the hair color matching module 92, the hair extension blending module 94, and the data analytics dashboard module 96 that were previously discussed above.

Referring to FIGS. 30-36, a flowchart of a method for generating a final modified user image 820 having the hair of the user with a selected hair extension thereon utilizing the virtual hair extension system 1630 in accordance with another exemplary embodiment will be explained.

At step 1700, the computer 1660 receives a user image 540 (shown in FIG. 11) of a user having hair from a digital camera 1654, and sends the user image 540 to a cloud-based computer 1665 utilizing the Internet 1632. After step 1700, the method advances to step 1702.

At step 1702, the cloud-based computer 1665 stores the user image 540 in a memory device 1667. The cloud-based computer 1665 has a hair segmentation module 90 (shown in FIG. 29), a hair color matching module 92, a hair extension blending module 94, and a data analytics dashboard module 96. After step 1702, the method advances to step 1704.

At step 1704, the hair segmentation module 90 has a convolution neural network module 110 (shown in FIG. 10) that generates the binary hair mask 542 (shown in FIG. 11) utilizing the user image 540. After step 1704, the method advances to step 1706.

At step 1706, the hair segmentation module 90 multiplies each pixel of the user image 540 (shown in FIG. 11) by a corresponding pixel of the binary hair mask 542 to obtain a segmented user hair image 544 (shown in FIG. 11) in an RGB color space. The segmented user hair image 544 illustrates only the hair of the user image 540. After step 1706, the method advances to step 1708.

At step 1708, the hair color matching module 92 generates a segmented user hair image in a HSV color space from the segmented user hair image 544 in the RGB color space. After step 1708, the method advances to step 1710.

At step 1710, the hair color matching module 92 generates a normalized histogram of hair pixels 560 (shown in FIG. 12) from the segmented user hair image in the HSV color space. After step 1710, the method advances to step 1712.

At step 1712, the cloud-based computer 1665 makes a determination as to whether the normalized histogram of hair pixels 560 indicate hair pixels having one of a plurality of predefined colors (e.g., pink, blue, green). If the value of step 1712 equals "yes", the method deletes the user image 540 and returns to step 1700. Otherwise, the method advances to step 1720.

At step 1720, the hair color matching module 92 selects hair pixels in a selected set of most populated bins in the normalized histogram of hair pixels 560 to obtain a compressed histogram of hair pixels. After step 1720, the method advances to step 1722.

At step 1722, the cloud-based computer 1665 makes a determination as to whether the user will manually select a color sub-group indicating their hair color. This determination can be based on a stored software flag in the memory device 52 for example. If the value of step 1722 equals "yes", the method advances to step 1724. Otherwise, the method advances to step 1744.

At step 1724, the cloud-based computer 1665 sends a message to the user computer 1660 requesting that the user select a color sub-group indicating their hair color, utilizing the Internet 1632. After step 1724, the method advances to step 1726.

At step 1726, the user computer 1660 displays a GUI 600 (shown in FIG. 14) requesting that the user select a color sub-group (e.g., a black, brown, or blonde) indicating their hair color on a display device 1656. After step 1726, the method advances to step 1728.

At step 1728, the user computer 1660 receives a user input from an input device 1650 indicating a selected color sub-group (e.g., a black, brown, or blonde) and sends the selected color sub-group to the cloud-based computer 1665 utilizing the Internet 1632. After step 1728, the method advances to step 1730.

At step 1730, the hair color matching module 92 selects one of a black shades classifier module 250 (shown in FIG. 29), a brown shades classifier module 252, and a blonde shades classifier module 254 (which is a selected shades classifier module) based on the selected color sub-group. The selected shades classifier module determines a plurality of confidence scores associated with a plurality of color shades. Each confidence score indicates a probability that a color of hair in the segmented user hair image in the HSV color space matches a color shade associated with the selected shades classifier module and further associated with a plurality of hair extensions. After step 1730, the method advances to step 1740.

At step 1740, the hair color matching module 92 sorts a list of the plurality of color shades based on the plurality of confidence scores from a respective color shade thereof having a highest confidence score to a respective color shade thereof having a lowest confidence score. After step 1740, the method advances to step 1742.

At step 1742, the cloud-based computer 1665 stores the list of the plurality of color shades and the associated plurality of confidence scores in the memory device 1667 such that each color shade thereof has a respective confidence score thereof. After step 1742, the method advances to step 1744.

At step 1744, the cloud-based computer 1665 makes a determination as to whether the cloud-based computer 1665 will automatically determine a color shade of hair in the user image 540. This determination can be based on a stored software flag in the memory device 1667 for example. If the value of step 1744 equals "yes", the method advances to step 1746. Otherwise, the method advances to step 1760.

At step 1746, the hair color matching module 92 selects a comprehensive shades classifier module 256 for all specified color shades of all specified color sub-groups (e.g., black, brown, blonde). The comprehensive shades classifier module 256 determines a plurality of confidence scores associated with a plurality of color shades. Each confidence score indicates a probability that a color of hair in the segmented user hair image in the HSV color space matches a color shade associated with the comprehensive shades classifier module 256 and further associated with a plurality of hair extensions. After step 1746, the method advances to step 1748.

At step 1748, the hair color matching module 92 sorts a list of the plurality of color shades based on the plurality of confidence scores from a respective color shade thereof having a highest confidence score to a respective color shade thereof having a lowest confidence score. After step 1748, the method advances to step 1750.

At step 1750, the cloud-based computer 1665 stores the list of the plurality of color shades and the associated plurality of confidence scores in the memory device 1667 such that each color shade thereof has a respective confidence score thereof. After step 1750, the method advances to step 1760.

At step 1760, the cloud-based computer 1665 sends hair extension images and SKUs associated with a subset of the plurality of hair extensions to the user computer 1660 utilizing the Internet 1632. Each hair extension image corresponds to a respective hair extension having a respective SKU. The subset of the plurality of hair extensions having color shades with confidence scores within an upper range of the plurality of confidence scores. After step 1760, the method advances to step 1762.

At step 1762, the user computer 1660 displays a GUI 660 (shown in FIG. 19) having the hair extension images thereon and requests that the user select one of the hair extensions on the display device 1656. After step 1762, the method advances to step 1764.

At step 1764, the user computer 1660 receives a user input from an input device 1650 indicating a selected hair extension and SKU. After step 1764, the method advances to step 1766.

At step 1766, the user computer 1660 sends the SKU of the selected hair extension to the cloud-based computer 1665. After step 1766, the method advances to step 1768.

At step 1768, the cloud-based computer 1665 retrieves data associated with the SKU from a hair extension database 1670 (shown in FIG. 28). The data includes a color, a length, a volume, a price, and a selected hair extension image of the selected hair extension. After step 1768, the method advances to step 1770.

At step 1770, the hair extension blending module 94 applies convolution to the binary hair mask 542 and the user image 540 utilizing a plurality of Gabor filters 280 which output a plurality of score numbers for each pixel, and selects a highest score of the plurality of score numbers for each pixel to generate the hair orientation mask 700. The hair orientation mask 700 indicates the orientation of the hair in the user image 540. After step 1770, the method advances to step 1780.

At step 1780, the cloud-based computer 1665 makes a determination as to whether the user image 540 a frontal image of the user. If the value of step 1780 equals "yes", the method advances to step 1782. Otherwise, the method advances to step 1784.

At step 1782, the hair extension blending module 94 determines a scale of the user image 540 by utilizing 2D landmarks on the user image 540 to determine a number of pixels between both eyes of the user in the user image 540, and then divides the number of pixels between both eyes by a predetermined eye separation distance. After step 1782, the method advances to step 1784.

At step 1784, the cloud-based computer 1665 makes a determination as to whether the user image 540 is a rear image of the user. If the value of step 1784 equals "yes", the method advances to step 1786. Otherwise, the method advances to step 1788.

Figure 18:
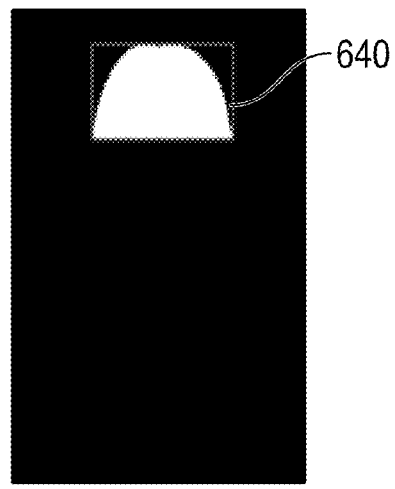
FIG. 18 is a schematic of an upper quadrant of the binary hair mask that is utilized by the hair extension blending module.

At step 1786, the hair extension blending module 94 determines a scale of the user image 540 by obtaining an upper quarter region 640 (shown in FIG. 18) of the binary hair mask 542 and determining a number of pixels across the upper quarter region 640 of the binary hair mask 542, and then dividing the number of pixels across the upper quarter region 640 of the binary hair mask 542 by a predetermined head width. After step 1786, the method advances to step 1788.

At step 1788, the hair extension blending module 94 determines an estimated hair length of the hair of the user by generating a bounding box around the binary hair mask 542 and determines a pixel height of the bounding box to determine a pixel hair length, and then divides the pixel hair length by a scale of the user image 540. After step 1788, the method advances to step 1790.

At step 1790, the hair extension blending module 94 generates a resized binary hair mask 742 (shown in FIG. 21) utilizing the binary hair mask 542 (shown in FIG. 21), the estimated hair length, and a desired length and a desired volume associated with the SKU of the selected hair extension. The resized binary hair mask 742 has the desired length and the desired volume. After step 1790, the method advances to step 1800.

At step 1800, the hair extension blending module 94 generates a resized hair orientation mask 750 (shown in FIG. 21) utilizing the hair orientation mask 700, the estimated hair length, and a desired length and a desired volume associated with the SKU of the selected hair extension. The resized hair orientation mask 750 has the desired length and the desired volume associated with the SKU of the selected hair extension. After step 1800, the method advances to step 1802.

At step 1802, the hair extension blending module 94 has a generative adversarial neural network module 290 (shown in FIG. 22) that generates a first modified user image 781 (shown in FIG. 22) and a second modified user image 782 utilizing the user image 540, the reference image 770, the resized binary hair mask 742, and the resized hair orientation mask 750. The first modified user image 781 has hair with a color corresponding to a color of the hair in the user image 540, and having the desired length and the desired volume. The second modified user image 782 has hair with a color corresponding to a color of the hair in the reference image 770, and having the desired length and the desired volume. The color of hair in the reference image 770 is identical to a color of hair associated with the SKU of the selected hair extension. After step 1802, the method advances to step 1804.

At step 1804, the hair extension blending module 94 generates a blending mask 800 (shown in FIG. 23) by multiplying each pixel of the resized binary hair mask 742 by a corresponding pixel of the resized hair orientation mask 750. After step 1804, the method advances to step 1806.

At step 1806, the hair extension blending module 94 has an Alpha blending module 300 (shown in FIG. 24) that blends the first modified user image 781, the second modified user image 782, and the blending mask 800 to obtain a final modified user image 820 (shown in FIG. 24) having the hair of the user with the selected hair extension thereon. After step 1806, the method advances to step 1808.

At step 1808, the cloud-based computer 1665 stores the final modified user image 820 in the memory device 1667. After step 1808, the method advances to step 1820.

At step 1820, the cloud-based computer 1665 sends the final modified user image 820 to the user computer 1660 utilizing the Internet 1632. After step 1820, the method advances to step 1822.

At step 1822, the user computer 1660 displays the final modified user image 820 on the display device 1656. After step 1822, the method advances to step 1824.

At step 1824, the user computer 1660 receives a user dashboard selection requesting at least one of a clicks dashboard 1200 (shown in FIG. 25), a tryouts dashboard 1310 (shown in FIG. 26), and a SKUs dashboard 1410 (shown in FIG. 27). After step 1824, the method advances to step 1826.

At step 1826, the user computer 1660 sends the user dashboard selection to the cloud-based computer 1665 utilizing the Internet 1632. After step 1826, the method advances to step 1828.

At step 1828, the cloud-based computer 1665 retrieves at least one of the clicks dashboard 1200, the tryouts dashboard 1310, and the SKUs dashboard 1410 associated with the plurality of hair extensions from a data analytics database 1672, based on the user dashboard selection. After step 1828, the method advances to step 1830.

At step 1830, the cloud-based computer 1665 sends the selected one of the clicks dashboard 1200, the tryouts dashboard 1310, and the SKUs dashboard 1410 to the user computer 1660 utilizing the Internet 1632. After step 1830, the method advances to step 1832.

At step 1832, the user computer 1660 displays the selected one of the clicks dashboard 1200, the tryouts dashboard 1310, and the SKUs dashboard 1410 on the display device 1656.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine-readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A virtual hair extension system, comprising:
a memory device having a user image of a user having hair;
a display device;
a computer being operably coupled to the memory device and the display device, the computer having a hair segmentation module, and a hair extension blending module;
the hair segmentation module generating a binary hair mask based on the user image;
the hair extension blending module generating a final modified user image having the hair of the user with a selected hair extension thereon utilizing the user image, the binary hair mask, and a reference image having the selected hair extension therein;
the computer displaying the final modified user image having the hair of the user with the selected hair extension thereon on the display device;
the hair extension blending module generating a hair orientation mask utilizing a binary hair mask, the user image, and a plurality of Gabor filters; the hair orientation mask indicating an orientation of the hair in the user image;
the hair extension blending module determining an estimated hair length of the hair of the user utilizing the user image and the binary hair mask;
the hair extension blending module generating a resized binary hair mask utilizing the binary hair mask, the estimated hair length, and a desired length and a desired volume of hair associated with a SKU of the selected hair extension, the resized binary hair mask having the desired length and the desired volume;
the hair extension blending module generating a resized hair orientation mask utilizing the hair orientation mask, the estimated hair length, and the desired length and the desired volume of hair associated with the SKU of the selected hair extension, the resized hair orientation mask having the desired length and the desired volume;
the hair extension blending module having a generative adversarial neural network module that generates a first modified user image and a second modified user image based on the user image, the reference image, the resized binary hair mask, and the resized hair orientation mask; the first modified user image having hair with a color corresponding to a color of the hair in the user image, and having the desired length and the desired volume; the second modified user image having hair with a color corresponding to a color of the hair in the reference image, and having the desired length and the desired volume; the color of the hair in the reference image is identical to a color of hair associated with the SKU of the selected hair extension;
the hair extension blending module generating a blending mask by multiplying each pixel of the resized binary hair mask by a corresponding pixel of the resized hair orientation mask; and
the hair extension blending module having an Alpha blending module that blends the first modified user image, the second modified user image, and the blending mask to obtain the final modified user image having the hair of the user with the selected hair extension thereon.

2. The virtual hair extension system of claim 1, wherein:
the hair segmentation module having a convolution neural network module that generates the binary hair mask utilizing the user image; and
the hair segmentation module multiplying each pixel of the user image by a corresponding pixel of the binary hair mask to obtain a segmented user hair image in an RGB color space, the segmented user hair image illustrating only the hair of the user image.

3. The virtual hair extension system of claim 2, wherein:
the computer further having a hair color matching module;
the hair color matching module generating a list of a plurality of color shades and a plurality of confidence scores, each color shade of the plurality of color shades having a respective confidence score, each confidence score indicating a probability that a color of the hair in the segmented user hair image matches a color shade from a plurality of color shades associated with a plurality of hair extensions;
the computer displaying hair extension images associated with a subset of the plurality of hair extensions on the display device, the subset of the plurality of hair extensions having color shades with confidence scores within an upper range of the plurality of confidence scores; and
the computer receiving a user selection of a selected hair extension corresponding to one of the hair extension images from an input device.

4. The virtual hair extension system of claim 1, wherein:
the computer storing the final modified user image in the memory device.

5. The virtual hair extension system of claim 1, wherein:
the computer further having a data analytics dashboard module, the data analytics dashboard module displaying a clicks dashboard on the display device.

6. The virtual hair extension system of claim 5, wherein:
the data analytics dashboard module displaying a tryouts dashboard on the display device.

7. The virtual hair extension system of claim 6, wherein:
the data analytics dashboard module displaying a SKUs dashboard on the display device.

8. A virtual hair extension system, comprising:
a memory device having a user image of a user having hair;
a computer being operably coupled to the memory device, the computer having a hair color matching module;
the hair color matching module generating a segmented user hair image in a HSV color space from a segmented user hair image in an RGB color space;
the hair color matching module generating a normalized histogram of hair pixels from the segmented user hair image in the HSV color space;
the hair color matching module selecting hair pixels in a selected set of most populated bins in the normalized histogram of hair pixels to obtain a compressed histogram of hair pixels;
the hair color matching receiving a user input indicating a first color sub-group;
the hair color matching module selecting one of a black shades classifier module, a brown shades classifier module, and a blonde shades classifier module which is a selected shades classifier module based on the selected color sub-group, the selected shades classifier module determining a plurality of confidence scores associated with a plurality of color shades, each confidence score indicating a probability that a color of hair in the segmented user hair image in the HSV color space matches a color shade associated with the selected shades classifier module and further associated with a plurality of hair extensions
the hair color matching module sorting a list of the plurality of color shades based on the plurality of confidence scores from a respective color shade thereof having a highest confidence score to a respective color shade thereof having a lowest confidence score; and
the computer storing the list of the plurality of color shades and the associated plurality of confidence scores in the memory device such that each color shade thereof has a respective confidence score thereof.

9. The virtual hair extension system of claim 8, wherein:
the selected set of most populated bins in the filtered histogram of hair pixels corresponds to a most populated 5% of bins in the filtered histogram of hair pixels.

10. A virtual hair extension system, comprising:
a memory device having a user image of a user having hair;
a computer being operably coupled to the memory device, the computer having a hair color matching module;
the hair color matching module generating a segmented user hair image in an HSV color space from a segmented user hair image in an RGB color space;
the hair color matching module generating a normalized histogram of hair pixels from the segmented user hair image in the HSV color space;
the hair color matching module selecting hair pixels in a selected set of most populated bins in the normalized histogram of hair pixels to obtain a compressed histogram of hair pixels;
the hair color matching module selecting a comprehensive shades classifier module for all specified color shades of all specified color sub-groups, the comprehensive shades classifier module determining a plurality of confidence scores associated with a plurality of color shades, each confidence score indicating a probability that a color of hair in the segmented user hair image in the HSV color space matches a color shade associated with the comprehensive shades classifier module and further associated with a plurality of hair extensions;
the hair color matching module sorting a list of the plurality of color shades based on the plurality of confidence scores from a respective color shade thereof having a highest confidence score to a respective color shade thereof having a lowest confidence score; and
the computer storing the list of the plurality of color shades and the associated plurality of confidence scores in the memory device such that each color shade thereof has a respective confidence score thereof.

11. The virtual hair extension system of claim 10, wherein:
the selected set of most populated bins in the filtered histogram of hair pixels corresponds to a most populated 5% of bins in the filtered histogram of hair pixels.

12. A virtual hair extension system, comprising:
a memory device having a reference image of a selected hair extension, and a user image of a user having hair;
a computer being operably coupled to the memory device, the computer having a hair extension blending module;
the hair extension blending module generating a hair orientation mask utilizing a binary hair mask, the user image, and a plurality of Gabor filters; the hair orientation mask indicating an orientation of the hair in the user image;
the hair extension blending module determining an estimated hair length of the hair of the user utilizing the user image and the binary hair mask;
the hair extension blending module generating a resized binary hair mask utilizing the binary hair mask, the estimated hair length, and a desired length and a desired volume of hair associated with a SKU of the selected hair extension, the resized binary hair mask having the desired length and the desired volume;
the hair extension blending module generating a resized hair orientation mask utilizing the hair orientation mask, the estimated hair length, and the desired length and the desired volume of hair associated with the SKU of the selected hair extension, the resized hair orientation mask having the desired length and the desired volume;
the hair extension blending module having a generative adversarial neural network module that generates a first modified user image and a second modified user image based on the user image, the reference image, the resized binary hair mask, and the resized hair orientation mask; the first modified user image having hair with a color corresponding to a color of the hair in the user image and having the desired length and the desired volume; the second modified user image having hair with a color corresponding to a color of the hair in the reference image and having the desired length and the desired volume; the color of the hair in the reference image is identical to the color of hair associated with the SKU of the selected hair extension;

the hair extension blending module generating a blending mask by multiplying each pixel of the resized binary hair mask by a corresponding pixel of the resized hair orientation mask; and the hair extension blending module having an Alpha blending module that blends the first modified user image, the second modified user image, and the blending mask to obtain a final modified user image having the hair of the user with the selected hair extension thereon.

13. The virtual hair extension system of claim 12, further comprising:
a display device operably coupled to the computer; and
the computer displaying the final modified user image on the display device.

14. The virtual hair extension system of claim 12, wherein:
the computer storing the final modified user image in the memory device.

15. The virtual hair extension system of claim 12, wherein:
the hair extension blending module generating the hair orientation mask by applying convolution to the binary hair mask and the user image utilizing a plurality of Gabor filters which output a plurality of score numbers for each pixel; and
the hair extension blending module selecting a highest score of the plurality of score numbers for each pixel to form the hair orientation mask, the hair orientation mask indicating the orientation of the hair.

16. The virtual hair extension system of claim 12, wherein:
the hair extension blending module determining the estimated hair length of the hair of the user by generating a bounding box of the binary hair mask and determining a pixel height of the bounding box to determine a pixel hair length, and then dividing the pixel hair length by a scale of the user image.

17. The virtual hair extension system of claim 12, wherein:
when the user image is a frontal image of the user, the scale of the user image is determined by utilizing 2D landmarks on the user image to determine a number of pixels between both eyes of the user in the user image, and dividing the number of pixels between both eyes by a predetermined eye separation distance.

18. The virtual hair extension system of claim 12, wherein:
when the user image is a rear image of the user, the scale of the user image is determined by obtaining an upper quarter region of the binary hair mask and determining a number of pixels across the upper quarter region of the binary hair mask, and then dividing the number of pixels across the upper quarter region of the binary hair mask by a predetermined head width.

19. A virtual hair extension system, comprising:
a memory device having a user image of a user having hair;
a display device;
a computer being operably coupled to the memory device and the display device, the computer having a hair segmentation module, and a hair extension blending module;
the hair segmentation module generating a binary hair mask based on the user image;
the hair extension blending module generating a final modified user image having the hair of the user with a selected hair extension thereon utilizing the user image, the binary hair mask, and a reference image having the selected hair extension therein;
the computer displaying the final modified user image having the hair of the user with the selected hair extension thereon on the display device;
the hair segmentation module having a convolution neural network module that generates the binary hair mask utilizing the user image; and
the hair segmentation module multiplying each pixel of the user image by a corresponding pixel of the binary hair mask to obtain a segmented user hair image in an RGB color space, the segmented user hair image illustrating only the hair of the user image;
the computer further having a hair color matching module;
the hair color matching module generating a list of a plurality of color shades and a plurality of confidence scores, each color shade of the plurality of color shades having a respective confidence score, each confidence score indicating a probability that a color of the hair in the segmented user hair image matches a color shade from a plurality of color shades associated with a plurality of hair extensions;
the computer displaying hair extension images associated with a subset of the plurality of hair extensions on the display device, the subset of the plurality of hair extensions having color shades with confidence scores within an upper range of the plurality of confidence scores; and
the computer receiving a user selection of a selected hair extension corresponding to one of the hair extension images from an input device.

* * * * *